(12) United States Patent
Urano et al.

(10) Patent No.: US 11,810,461 B2
(45) Date of Patent: Nov. 7, 2023

(54) VEHICLE DISPATCH SYSTEM, VEHICLE DISPATCH SERVER, AND VEHICLE DISPATCH METHOD

(71) Applicant: TOYOTA JIDOSHA KABUSHIKI KAISHA, Toyota (JP)

(72) Inventors: Hiromitsu Urano, Numazu (JP); Sho Otaki, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 72 days.

(21) Appl. No.: 17/467,911

(22) Filed: Sep. 7, 2021

(65) Prior Publication Data
US 2022/0084412 A1  Mar. 17, 2022

(30) Foreign Application Priority Data

Sep. 11, 2020 (JP) ................................ 2020-153081

(51) Int. Cl.
| | |
|---|---|
| *G08G 1/00* | (2006.01) |
| *B60W 60/00* | (2020.01) |
| *G05D 1/00* | (2006.01) |
| *G05D 1/02* | (2020.01) |
| *G06Q 10/047* | (2023.01) |
| *G06Q 50/30* | (2012.01) |

(52) U.S. Cl.
CPC ......... *G08G 1/202* (2013.01); *B60W 60/0021* (2020.02); *B60W 60/00253* (2020.02); *G05D 1/0027* (2013.01); *G05D 1/0217* (2013.01); *G06Q 10/047* (2013.01); *G06Q 50/30* (2013.01); *G05D 2201/0213* (2013.01)

(58) Field of Classification Search
CPC .............. G08G 1/202; B60W 60/0021; B60W 60/00253; G05D 1/0027; G05D 1/0217; G06Q 10/047; G06Q 50/30
See application file for complete search history.

(56) References Cited

U.S. PATENT DOCUMENTS

| | | | | |
|---|---|---|---|---|
| 2019/0186936 A1* | 6/2019 | Ebner | ..................... | G06N 20/00 |
| 2020/0371516 A1* | 11/2020 | Walossek | ............. | G05D 1/0061 |
| 2021/0163040 A1* | 6/2021 | Kojo | ..................... | G05D 1/0212 |
| 2021/0183247 A1* | 6/2021 | Pandit | ..................... | G08G 1/202 |

FOREIGN PATENT DOCUMENTS

| | | | | |
|---|---|---|---|---|
| CN | 108764765 | * | 11/2018 | ....... G06Q 10/08355 |
| JP | 11-003494 A | | 1/1999 | |
| JP | 2017-174208 A | | 9/2017 | |
| WO | 2019/220205 A1 | | 11/2019 | |

\* cited by examiner

*Primary Examiner* — Jelani A Smith
*Assistant Examiner* — Nada Mahyoob Alqaderi
(74) *Attorney, Agent, or Firm* — Sughrue Mion, PLLC

(57) ABSTRACT

A vehicle dispatch system for dispatching an autonomous driving vehicle capable of traveling with remote assistance by a remote operator. The vehicle dispatch system comprising: a required time prediction unit for predicting the required time until the autonomous driving vehicle arrives at a point of dispatch by a route, a remote assistance request number calculation unit for calculating the remote assistance request number on a route, and a vehicle dispatch determination unit for determining the vehicle dispatch route to the point of dispatch where the autonomous driving vehicle travels based on the required time for each route and the remote assistance request number for each route, when the route search unit searched for a plurality of the routes.

6 Claims, 11 Drawing Sheets

VEHICLE DISPATCH SYSTEM, VEHICLE DISPATCH SERVER, AND VEHICLE DISPATCH METHOD

CROSS-REFERENCE TO RELATED APPLICATION

This application claims the benefit of priority from Japanese Patent Application No. 2020-153081, filed Sep. 11, 2020, the entire contents of which are incorporated herein by reference.

TECHNICAL FIELD

The present disclosure relates to a vehicle dispatch system, a vehicle dispatch server, and vehicle dispatch method.

BACKGROUND

In the related art, International Publication No. 2019-220205 is known as technical literature relating to a vehicle dispatch system. International Publication No. 2019-220205 discloses a vehicle dispatch system for dispatching the autonomous driving vehicle in response to a request from a user. The vehicle dispatch system calculates a vehicle dispatch position candidate in the vicinity of the user's request point, and a vehicle is set for each of the vehicle dispatch position candidates. The vehicle dispatch system determines the dispatch vehicle and the vehicle dispatch position based on the total trip time for each of the vehicle dispatch position candidates.

SUMMARY

Incidentally, when it becomes desirable to reflect the judgment by the human during the running of the autonomous driving vehicle, the autonomous driving vehicle is considered to continue the running by receiving the remote instruction by the remote operator (human). In this case, it is desirable that the route and the like are determined in consideration of not only the time required to reach the point of dispatch but also the presence of the remote operator.

According to an aspect of the present disclosure, a vehicle dispatch system for dispatch autonomous driving vehicles capable of traveling with remote assistance by a remote operator. The vehicle dispatch system includes a route search unit configured to search a route to a point of dispatch based on a predetermined point of dispatch, the position of the autonomous driving vehicle, and map information; a required time prediction unit configured to predict a required time until the autonomous driving vehicle arrives at the point of dispatch by the route based on the map information; a remote assistance request number calculation unit configured to calculate remote assistance request number on the route, which is the number of the remote assistance request that the autonomous driving vehicle requests the remote operator for the remote assistance, based on the route and a predetermined remote assistance request condition; a vehicle dispatch determination unit configured to determine a vehicle dispatch route to the point of dispatch where the autonomous driving vehicle travels, based on the required time for each route and the remote assistance request number for each route, when the route search unit searched for a plurality of the routes.

According to the vehicle dispatch system according to one aspect of the present disclosure, it is calculated the remote assistance request number which is the number of the remote assistance requests by the autonomous driving vehicle to the remote operator for each route to the point of dispatch, and the vehicle dispatch route to the point of dispatch where the autonomous driving vehicle travels is determined on the basis of the required time for each route and the remote assistance request number for each route. Therefore, the load of the remote operator can be reduced compared with when the remote assistance request number is not considered.

The vehicle dispatch system according to an aspect of the present disclosure may further include a dispatched candidate vehicle selection unit configured to select dispatched candidate vehicle for the point of dispatch from a plurality of the autonomous driving vehicles based on the point of dispatch and the positions of the autonomous driving vehicles, wherein the vehicle dispatch determination unit determines the dispatch vehicle to be dispatched to the point of dispatch and the dispatch vehicle route of the dispatch vehicle based on the required time and the remote assistance request number in the routes to the point of dispatch searched for each of the dispatched candidate vehicles when there is a plurality of the dispatched candidate vehicles selected by the dispatched candidate vehicle selection unit.

In the vehicle dispatch system according to one aspect of the present disclosure, the vehicle dispatch determination unit may determine whether or not the section up to the route branch point is common to all the routes of the autonomous driving vehicle when there are a plurality of the routes searched by the route search unit, and postpone the determination of the vehicle dispatch route until a route branch point is reached by the autonomous driving vehicle when it is determined that the section up to the route branch point is common to all the routes.

In the vehicle dispatch system according to one aspect of the present disclosure, the required time prediction unit may acquire the trajectory of autonomous driving including a path on the route and a vehicle speed plan, and predict a required time until the autonomous driving vehicle arrives at the point of dispatch based on the trajectory, wherein the path and the vehicle speed plan are generated in accordance with the point of dispatch, the route, the map information, the external environment of the autonomous driving vehicle, and the traveling state of the autonomous driving vehicle.

According to another aspect of the present disclosure, a vehicle dispatching server for dispatching the autonomous driving vehicles capable of traveling with remote assistance by a remote operator. The vehicle dispatching server includes a route search unit configured to search a route to a point of dispatch based on a predetermined point of dispatch, the position of the autonomous driving vehicle, and map information; a required time prediction unit configured to predict a required time until the autonomous driving vehicle arrives at the point of dispatch by the route based on the map information; a remote assistance request number calculation unit configured to calculate remote assistance request number on the route, which is the number of the remote assistance request that the autonomous driving vehicle requests the remote operator for the remote assistance, based on the route and a predetermined remote assistance request condition; a vehicle dispatch determination unit configured to determine a vehicle dispatch route to the point of dispatch where the autonomous driving vehicle travels, based on the required time for each route and the remote assistance request number for each route, when the route search unit searched for a plurality of the routes.

According to the vehicle dispatch server according to another aspect of the present disclosure, it is calculated the remote assistance request number which is the number of the remote assistance requests by the autonomous driving vehicle to the remote operator for each route to the point of dispatch, and the vehicle dispatch route to the point of dispatch where the autonomous driving vehicle travels is determined on the basis of the required time for each route and the remote assistance request number for each route. Therefore, the load of the remote operator can be reduced compared with when the remote assistance request number is not considered.

Another aspect of the present disclosure is vehicle dispatch method of a vehicle dispatch system for dispatching autonomous driving vehicle capable of traveling with remote assistance by a remote operator. The method includes searching a route to a point of dispatch based on a predetermined point of dispatch, the position of the autonomous driving vehicle, and map information, predicting a required time until the autonomous driving vehicle arrives at the point of dispatch by the route based on the map information, calculate remote assistance request number on the route, which is the number of the remote assistance request that the autonomous driving vehicle requests the remote operator for the remote assistance, based on the route and a predetermined remote assistance request condition, determining a vehicle dispatch route to the point of dispatch where the autonomous driving vehicle travels, based on the required time for each route and the remote assistance request number for each route, when a plurality of the routes searched.

According to the vehicle dispatch method according to another aspect of the present disclosure, it is calculated the remote assistance request number which is the number of the remote assistance requests by the autonomous driving vehicle to the remote operator for each route to the point of dispatch, and the vehicle dispatch route to the point of dispatch where the autonomous driving vehicle travels is determined on the basis of the required time for each route and the remote assistance request number for each route. Therefore, the load of the remote operator can be reduced compared with when the remote assistance request number is not considered.

According to the vehicle dispatch system according to one aspect of the present disclosure, the vehicle dispatch server according to another aspect of the present disclosure, and the vehicle dispatch method according to another aspect of the present disclosure, the load on the remote operator can be reduced by determining the vehicle dispatch route based on the remote assistance request number.

DETAILED DESCRIPTION

Hereinafter, an example of the present disclosure will be described with reference to accompanying drawings.

The vehicle dispatch system according to this embodiment is a system for dispatching an autonomous driving vehicle in response to a vehicle dispatch request from a user. The vehicle dispatch request includes a ride request for use of the autonomous driving vehicle as a taxi or a pickup request for use of the autonomous driving vehicle as delivery.

Configuration of Vehicle dispatch System

Figure 1:
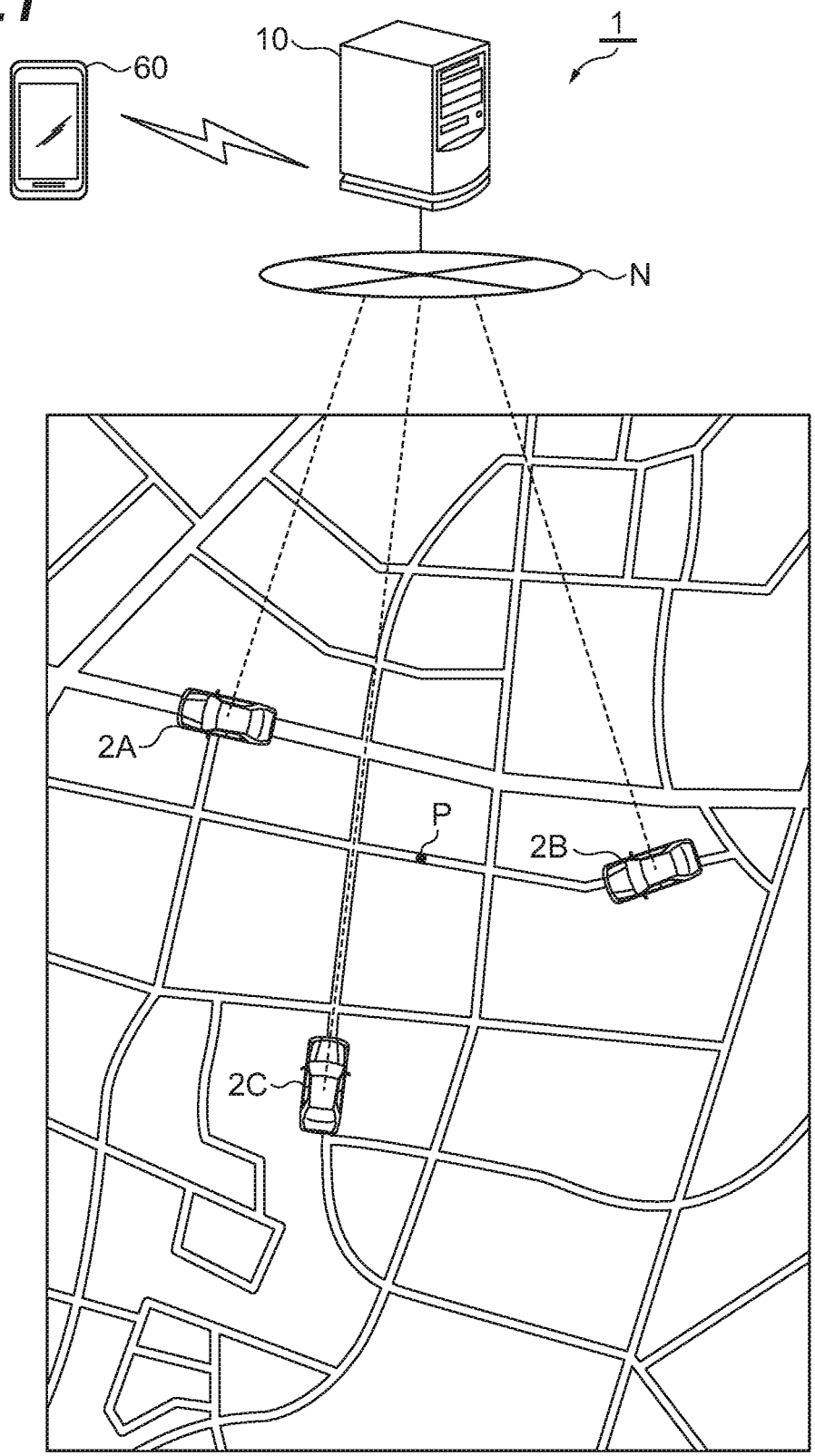
FIG. 1 is a diagram for explaining a vehicle dispatch system according to an embodiment.

As illustrated in FIG. 1, the vehicle dispatch system 1 includes the vehicle dispatch server 10. Details of the configuration of the vehicle dispatch server 10 will be described later. In addition to the vehicle dispatch server 10, the vehicle dispatch system 1 may include the autonomous driving vehicle 2 or a part of the autonomous driving vehicle 2.

The vehicle dispatch server 10 may be capable of communicating with the user terminal 50 and sets a point of dispatch P in response to a dispatch request from the user terminal 50. The vehicle dispatch server 10 may be is a server installed in a facility. The vehicle dispatch server 10 may be mounted on a moving object such as a vehicle or may be formed on a cloud. The user terminal 50 is a user's portable information terminal. The user terminal 50 may be constituted by a computer including a processor such as a central processing unit [CPU], a memory such as a read only memory [ROM], a random-access memory [RAM], a communication device, and an interface including a display and/or a touch panel.

The vehicle dispatch server 10 grasps the status of the autonomous driving vehicles 2A, 2B, 2C, by a wireless communication network N. The vehicle dispatch server 10 dispatches at least one of the autonomous driving vehicles to the point of dispatch P. The vehicle dispatch server 10 may manage by assigning a unique identification number to each autonomous driving vehicles. The wireless communication network N may include an internet line or a line for a portable information terminal, and is not particularly limited as long as it can perform wireless communication. Details of the point of dispatch P will be described later.

The vehicle dispatch server 10 may dispatch the autonomous driving vehicles (remote assistance vehicles) that perform an autonomous driving along with remote assistance by a remote operator. A remote operator is a person providing remote assistance to the autonomous driving vehicle. The remote assistance is an instruction regarding the travel of the autonomous driving vehicle from the remote operator. The remote assistance includes instructions to progress the autonomous driving vehicle and to stop the autonomous driving vehicle. The remote assistance may include the autonomous driving vehicle lane change indication. The remote assistance may also include an instruction to the autonomous driving vehicle regarding the entry and exit of the occupant (for example, an instruction to automatically open and close the door or an instruction to start the voice guidance of the exit). It can be referenced Japanese Patent Application No. 2019-146571 for details on remote assistance and remote servers.

The above described remote assistance is an example, and the remote assistance is not limited to an instruction to proceed or stop. The remote assistance may include remote manipulation of the autonomous driving vehicle by the remote operator R. In the remote control, for example, the accelerator operation of the remote operator R is reflected in the acceleration of the autonomous driving vehicle. Remote assistance may not include remote manipulation of the autonomous driving vehicle by the remote operator R.

Figure 2:
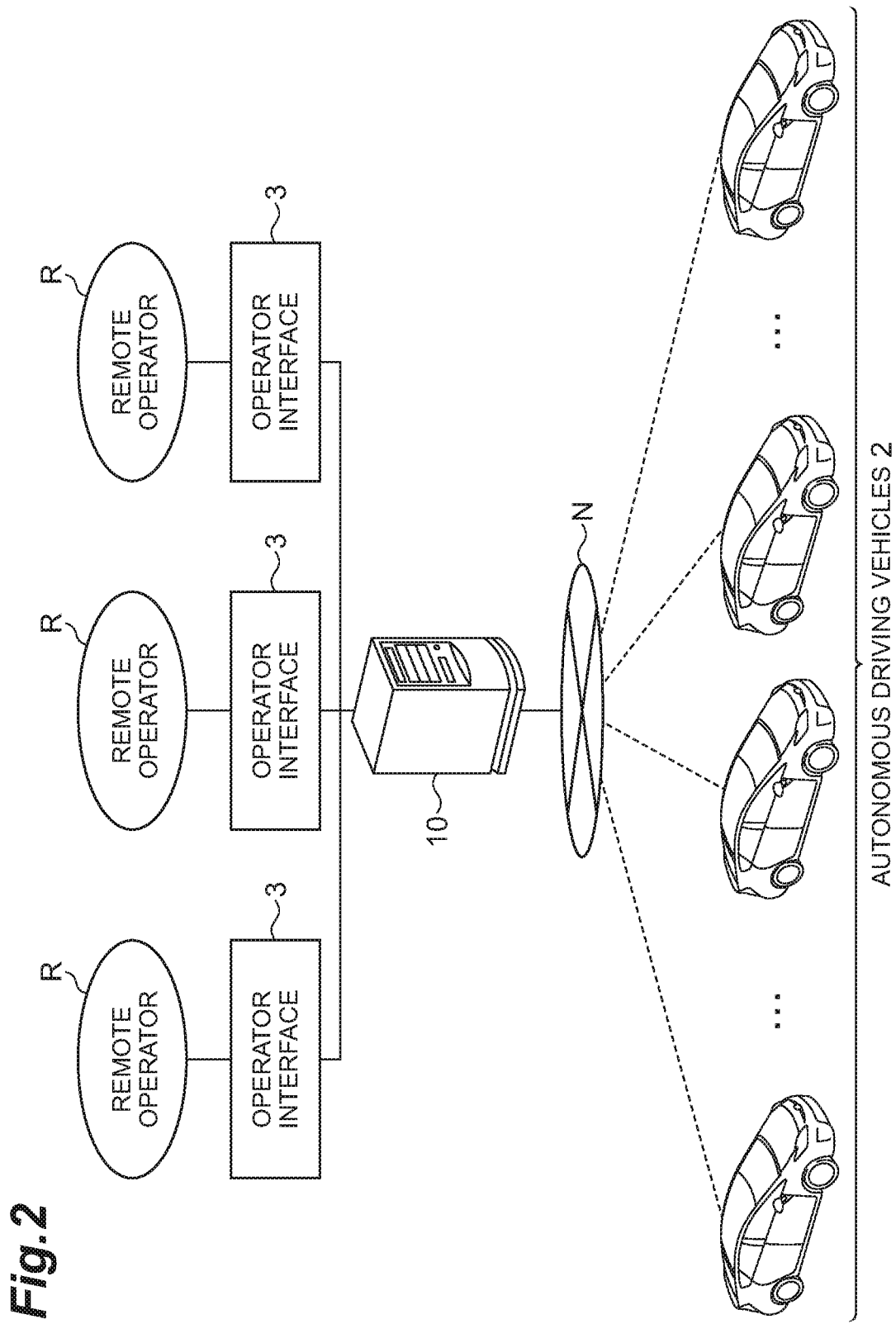
FIG. 2 is a diagram illustrating for explaining remote assistance to an autonomous driving vehicle.

FIG. 2 is a diagram for explaining the remote assistance to the autonomous driving vehicle. As illustrated in FIG. 2, the vehicle dispatch server 10 may also functions as a remote assistance server for transmitting the remote assistance of the remote operator R to the autonomous driving vehicle 2. The remote operator R transmits the remote assistance to the autonomous driving vehicle 2 as the remote assistance object by transmitting the remote assistance to the vehicle dispatch server 10 through the operator interface 3. The number of remote operators R may be one or more. At the vehicle dispatch server 10, remote assistance may be input to the remote operator R in response to a remote assistance request from the autonomous driving vehicle 2. The remote assistance server may be a server separate from the vehicle dispatch server 10.

Configuration of Autonomous Driving Vehicle

Figure 3:
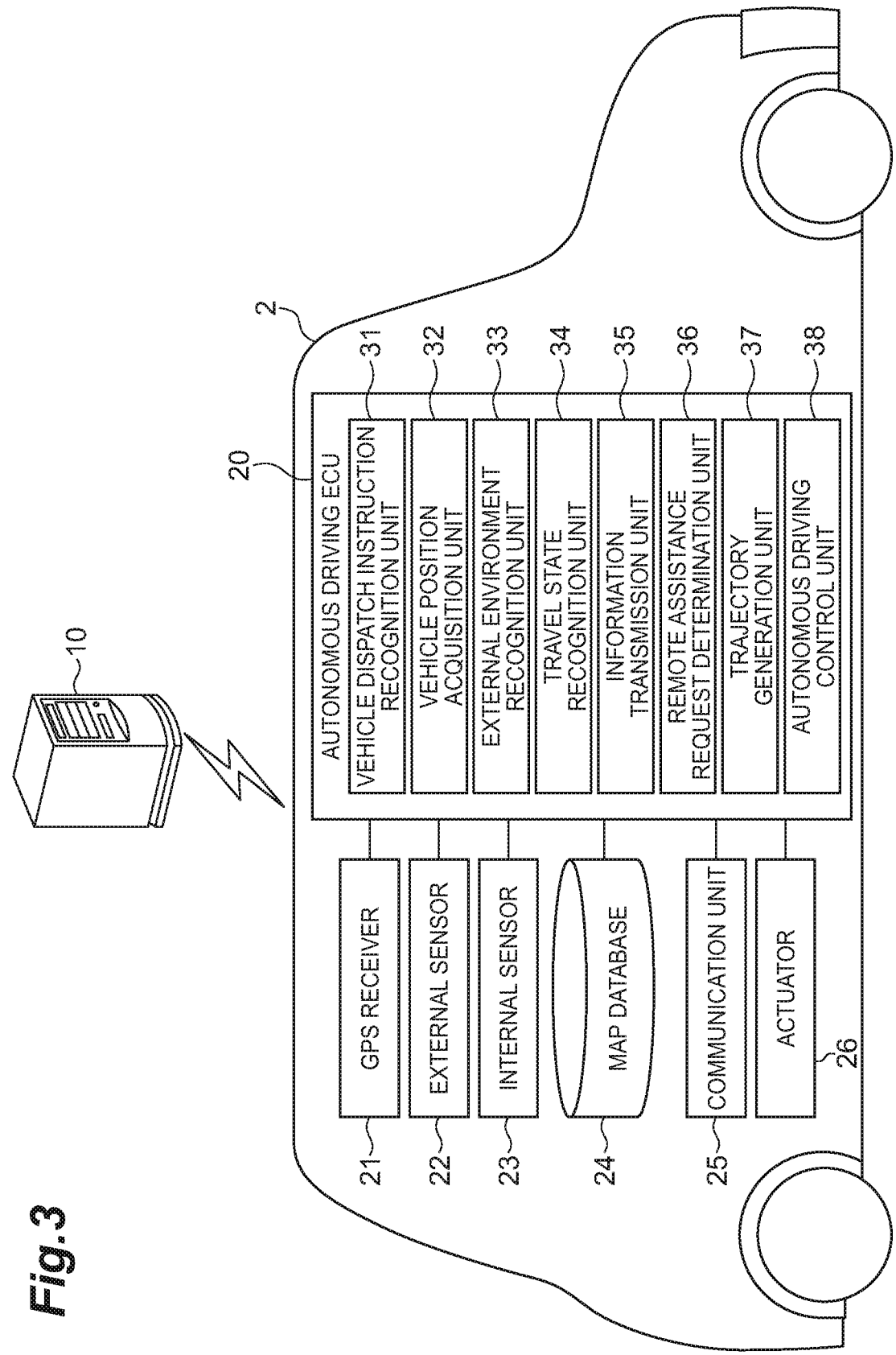
FIG. 3 is a block diagram illustrating an example of the configuration of autonomous driving vehicle.

First, an example of the configuration of the autonomous driving vehicle 2 will be described. FIG. 3 is a block diagram illustrating an example of the configuration of autonomous driving vehicle 2. As illustrated in FIG. 3, the autonomous driving vehicle 2 may include an autonomous driving electronic control unit [autonomous driving ECU] 20. The autonomous driving ECU 20 may be an electronic control unit having a processor such as a CPU, a memory such as a ROM or a RAM. In the autonomous driving ECU 20, various functions are realized by loading a program recorded in a ROM into a ram and executing the program loaded into the ram by a CPU. The autonomous driving ECU 20 may comprise a plurality of electronic units.

The autonomous driving ECU 20 is connected to a global positioning system receiver [GPS receiver] 21, an external sensor 22, an internal sensor 23, a map database 24, a communication unit 25, an actuator 26, and an exterior display 27.

GPS receiver 21 measures the location of the autonomous driving vehicle 2 (e.g., latitude and longitude of the autonomous driving vehicle 2) by receiving signals from 3 or more GPS satellites. GPS receiver 21 transmits the measured position information of the autonomous driving vehicle 2 to the autonomous driving ECU 20.

The external sensor 22 is an on-vehicle sensor for detecting the external environment of the autonomous driving vehicle 2. The external sensor 22 includes at least a camera. The camera is an imaging device for imaging the external environment of the autonomous driving vehicle 2. the autonomous driving vehicle 2 may be equipped with an external camera for the remote operator R.

The external sensor 22 may include a radar sensor. The radar sensor is a detection device that detects an object around the autonomous driving vehicle 2 using radio waves (e.g., millimeter waves) or light. The radar sensor includes, for example, a millimeter-wave radar or light detection and ranging [LIDAR]. The radar sensor detects an object by transmitting radio waves or light around the autonomous driving vehicle 2 and receiving the radio waves or light reflected by the object. The external sensor 22 may include a sonar sensor that detects sounds external to the autonomous driving vehicle 2.

The internal sensor 23 is an on-vehicle sensor for detecting the running state of the autonomous driving vehicle 2. The internal sensor 23 includes a vehicle speed sensor, an accelerometer sensor, and a yaw rate sensor. The vehicle speed sensor is a detector for detecting the speed of the autonomous driving vehicle 2. The acceleration sensor is a detector for detecting an acceleration of the autonomous driving vehicle 2. The acceleration sensor includes, for example, a longitudinal acceleration sensor for detecting an acceleration in the longitudinal direction of the autonomous driving vehicle 2. The acceleration sensor may include a lateral acceleration sensor that detects a lateral acceleration of the autonomous driving vehicle 2. The yaw rate sensor is a detector that detects the yaw rate (rotational angular velocity) around the vertical axis of the center of gravity of the autonomous driving vehicle 2. as the yaw rate sensor, for example, a gyro sensor can be used.

The map database 24 is a database for recording map information. The map database 24 is formed in a recording device such as a hard disk drive [HDD] mounted on the autonomous driving vehicle 2. The map information includes, for example, road position information, road shape information (for example, curvature information), position information of intersections and branch points, and the like. The map information may include traffic regulation information such as a legal maximum speed associated with the position information. The map information may include target information used to acquire the position information of the autonomous driving vehicle 2. The target may include road signs, road markings, traffic lights, utility poles. The map information may include position information of bus stops. The map database 24 may be configuration as a server capable of communicating with the autonomous driving vehicle 2.

The communication unit 25 is a communication device that controls wireless communication with the outside of the autonomous driving vehicle 2. The communication unit 25 transmits and receives various kinds of information with the vehicle dispatch server (remote assistance server) 10 via the wireless communication network N.

The actuator 26 is a device used to control the autonomous driving vehicle 2. The actuator 26 includes at least a drive actuator, a brake actuator, and a steering actuator. The drive actuator controls the amount of air supplied to the engine (throttle opening) in accordance with a control signal from the autonomous driving ECU 20 to control the driving force of the autonomous driving vehicle 2. When autonomous driving vehicle 2 is a hybrid vehicle, a control signal from the autonomous driving ECU 20 is input to a motor serving as a power source in addition to the amount of air supplied to the engine to control the driving force. When the autonomous driving vehicle 2 is an electric vehicle, a control signal from the autonomous driving ECU 20 is inputted to a motor serving as a power source to control the driving force. The motor as a power source in these cases constitutes the actuator 26. The exterior display 27 may be a projector to the window of the autonomous driving vehicle 2 or an image display device on outer surface of the autonomous driving vehicle 2.

The brake actuator controls the brake system in accordance with a control signal from the autonomous driving ECU 20 to control the braking force applied to the wheels of the vehicle. As the brake system, for example, a hydraulic brake system can be used. The steering actuator controls driving of an assist motor for controlling steering torque in the electric power steering system in accordance with a control signal from the autonomous driving ECU 20. Thus, the steering actuator controls the steering torque of the autonomous driving vehicle 2.

Next, an example of the functional configuration of the autonomous driving ECU 20 will be described. The autonomous driving ECU 20 includes a vehicle dispatch instruction recognition unit 31, a vehicle position acquisition unit 32, an external environment recognition unit 33, a travel state recognition unit 34, an information transmission unit 35, a remote assistance request determination unit 36, a trajectory generation unit 37, and an autonomous driving control unit 38. Some functions of the autonomous driving ECU 20 may be executed by a server capable of communicating with the autonomous driving vehicle 2. The server that can communicate may include the vehicle dispatch server 10.

The vehicle dispatch instruction recognition unit 31 recognizes the dispatch instruction which is the instruction relating to the dispatch transmitted from the vehicle dispatch server 10. The position information of the point of dispatch P is included in the dispatch instruction. If the vehicle dispatch instruction has already been determined, the vehicle dispatch route information may be included.

The vehicle position acquisition unit 32 acquires the position information (position on the map) of the autonomous driving vehicle receiving unit based on the position information of the GPS receiver 21 and the map information of the map database 24. The vehicle position acquisition unit 32 may acquire the position information of the autonomous driving vehicle 2 by the SLAM (simultaneous localization and mapping) technique using the target information included in the map information of the map database 24 and the detection result of the external sensor 22. The vehicle position acquisition unit 32 may recognize the lateral position of the autonomous driving vehicle 2 with respect to the lane (the position of the autonomous driving vehicle 2 in the lane width direction) from the positional relationship between the lane marking line and the autonomous driving vehicle 2, and include it in the position information. In addition, the vehicle position acquisition unit 32 may acquire the position information of the autonomous driving vehicle 2 by the method of known.

The external environment recognition unit 33 recognizes the external environment of the autonomous driving vehicle 2 based on the detection result of the external sensor 22. The external environment includes the relative positions of the surrounding objects to the autonomous driving vehicle 2. The external environment may include the relative velocity and direction of movement of the surrounding object relative to the autonomous driving vehicle 2. The external environment may include types of objects such as other vehicles, pedestrians, bicycles, etc. The type of the object can be identified by a known method such as pattern matching. The external environment may include the result of lot line recognition (lane line recognition) around the autonomous driving vehicle 2. The external environment may include a recognition result of the lighting state of the signal. For example, the external environment recognition unit 33 can recognize the lighting state of the signal ahead of the autonomous driving vehicle 2 (e.g., whether the lighting state is a passable lighting state or a pass-prohibited lighting state) based on the image of the camera of the external sensor 22.

The traveling state recognition unit 34 recognizes the traveling state of the autonomous driving vehicle 2 based on the detection result of the internal sensor 23. Driving conditions include vehicle speed of the autonomous driving vehicle 2, accelerations of the autonomous driving vehicle 2, and yaw rate of the autonomous driving vehicle 2. Specifically, the traveling state recognition unit 34 recognizes the vehicle speed of the autonomous driving vehicle 2 based on the vehicle speed information of the vehicle speed sensor. The traveling state recognition unit 34 recognizes the acceleration of the autonomous driving vehicle 2 based on the vehicle speed information of the acceleration sensor. The traveling state recognition unit 34 recognizes the direction of the autonomous driving vehicle 2 based on the yaw rate information of the yaw rate sensor.

The information transmission unit 35 transmits vehicle information relating to the status of the autonomous driving vehicle 2 to the vehicle dispatch server 10 via the communication unit 25. The vehicle information includes at least the position information of the autonomous driving vehicle 2. The vehicle information may include information on the remaining fuel (remaining amount of gasoline, remaining amount of battery, and the like) of the autonomous driving vehicle 2 or information on the mileage predicted from the remaining fuel.

The vehicle information may include the autonomous driving vehicle 2 status, such as during user pickup, during luggage transportation, or for other reasons, that the vehicle cannot be dispatched. The vehicle information may include information on the remaining number of passengers, and may include information on the loading capacity of the baggage (or the loading upper limit and the current loading capacity). The vehicle information may include the external environment (surrounding traffic information) of the autonomous driving vehicle 2 recognized by the external environment recognition unit 33. The vehicle information may include the traveling state of the autonomous driving vehicle 2 recognized by the traveling state recognition unit 34.

The remote assistance request determination unit 36 determines whether or not autonomous driving vehicle 2 should request remote assistance from the remote operator R. The remote assistance request determination unit 36 determines whether to request remote assistance based on at least one of the position information of the autonomous driving vehicle 2 acquired by the vehicle position acquisition unit 32 and the map information of the map database 24, the external environment recognized by the external environment recognition unit 33, and the course generated by the trajectory generation unit 37 described later.

The remote assistance request determination unit 36 determines that the remote assistance should be requested when the autonomous driving vehicle 2 enters the remote assistance request status. The remote assistance request status is a status that is preset as a status in which the autonomous driving vehicle should request remote assistance from the remote operator R.

The remote assistance request status may include the following conditions. The conditions include the autonomous driving vehicle 2 turning right at the intersection, the autonomous driving vehicle 2 entering the intersection with or without a traffic light, and the autonomous driving vehicle 2 passing through the traffic light (e.g., passes through a traffic light corresponding to a pedestrian crossing on the way), the autonomous driving vehicle 2 starting changing lanes, the autonomous driving vehicle 2 entering a construction section, the autonomous driving vehicle 2 entering a railroad crossing, the autonomous driving vehicle stopping at the point of dispatch P or the destination.

The autonomous driving vehicle 2 does not necessarily request remote assistance when turning right at the intersection. The autonomous driving vehicle 2 may automatically turn right at an intersection under certain conditions (e.g., no oncoming vehicle is detected) without requesting remote assistance. In the case of a country or area of right-hand traffic, the autonomous driving vehicle 2 may turn left at the intersection instead of turning right at the intersection.

The remote assistance request determination unit 36 may determine that remote assistance should be requested when the autonomous driving vehicle 2 enters an intersection or turns right at an intersection. The remote assistance request determination unit 36 may determine that the remote assistance should be requested when the autonomous driving vehicle 2 starts changing lanes to reach the destination. When the remote assistance request determination unit 36 determines that the remote assistance should be requested, it requests the remote assistance by the remote operator R from the vehicle dispatch server 10. The remote assistance request includes, for example, identification information of the autonomous driving vehicle 2.

The trajectory generation unit 37 generates a trajectory used for the autonomous driving of the autonomous driving vehicle 2. The trajectory generation unit 37 generates the trajectory of the autonomous driving based on the route, the map information, the position information, the external environment, and the traveling state of the vehicle. The trajectory corresponds to the travel plan of autonomous driving. The trajectory will be described in detail later.

The trajectory includes the path along which the vehicles will travel in autonomous driving and the vehicle speed plan in autonomous driving. The path is a locus on which vehicles in the autonomous driving are to travel on the dispatch route. The path can be steering angle plan data of the steering angle change of the autonomous driving vehicle 2 corresponding to the position on the vehicle dispatch route. The position on the dispatch route is, for example, a set longitudinal position set at predetermined intervals (for example, 1 m) in the traveling direction of the dispatch route. The steering angle plan is data in which a target steering angle is associated with each set longitudinal position.

The trajectory generation unit 37 generates a trajectory along which the autonomous driving vehicle 2 travels, for example, based on the vehicle dispatch route, the map information, the external environment of the autonomous driving vehicle 2, and the traveling state of the autonomous driving vehicle 2. The trajectory generation unit 37 may generate a route such that the autonomous driving vehicle 2 passes through the center of the lane (the center in the lane width direction) included in the dispatch route.

The vehicle speed plan is data in which a target vehicle speed is associated with each set longitudinal position, for example. The set longitudinal position may be set based on the travel time of the autonomous driving vehicle 2 instead of the distance. The set longitudinal position may be set as an arrival position one second after the vehicle and an arrival position two seconds after the vehicle. In this case, the vehicle speed plan can also be expressed as data corresponding to the travel time.

The trajectory generation unit 37 generates a vehicle speed plan based on the path and the traffic regulation information such as a legal maximum speed in the map information. Instead of the legal maximum speed, a speed preset for a position or section on the map may be used. When the autonomous driving vehicle 2 is an autonomous driving bus, the trajectory generation unit 37 may generate a local speed plan based on the operation plan including the arrival time determined at the stop, taking the stop time at the stop into consideration. The trajectory generation unit 37 generates a trajectory of the autonomous driving from the path and the vehicle speed plan. Note that the trajectory of generating a trajectory in the trajectory generating unit 37 is not limited to the above-described content, and the known method for autonomous driving can be adopted. The same applies to the content of the trajectory.

For example, in a situation where the autonomous driving vehicle 2 makes a right turn at an intersection, the trajectory generation unit 37 generates a trajectory where the autonomous driving vehicle 2 makes a right turn at the intersection so as to correspond to remote assistance for starting a right turn. The trajectory generation unit 37 may update the trajectory in accordance with changes in the external environment until the remote assistance is received. Further, when there is remote assistance for switching from turning right at the intersection to going straight at the intersection, the trajectory generation unit 37 may generate a trajectory to go straight at the intersection in advance.

The autonomous driving control unit 38 executes autonomous driving of the autonomous driving vehicle 2. The autonomous driving control unit 38 executes the autonomous driving of the autonomous driving vehicle 2 based on the external environment of the autonomous driving vehicle 2, the running state of the autonomous driving vehicle 2, and the trajectory generated by the trajectory generation unit 37. The autonomous driving control unit 38 transmits a control signal to the actuator 26, thereby performing autonomous driving of the autonomous driving vehicle 2.

The autonomous driving control unit 38 waits for reception of the remote assistance from the vehicle dispatch server 10 when the remote assistance request determination unit 36 requests the remote assistance from the vehicle dispatch server 10. The autonomous driving control unit 38 maintains the stop state until the remote assistance is received when the autonomous driving control unit 38 requests the remote assistance after the autonomous driving vehicle 2 stops. The autonomous driving control unit 38 executes autonomous driving (lane change, etc.) when it receives the remote assistance.

Configuration of Vehicle dispatching Server

Figure 4:
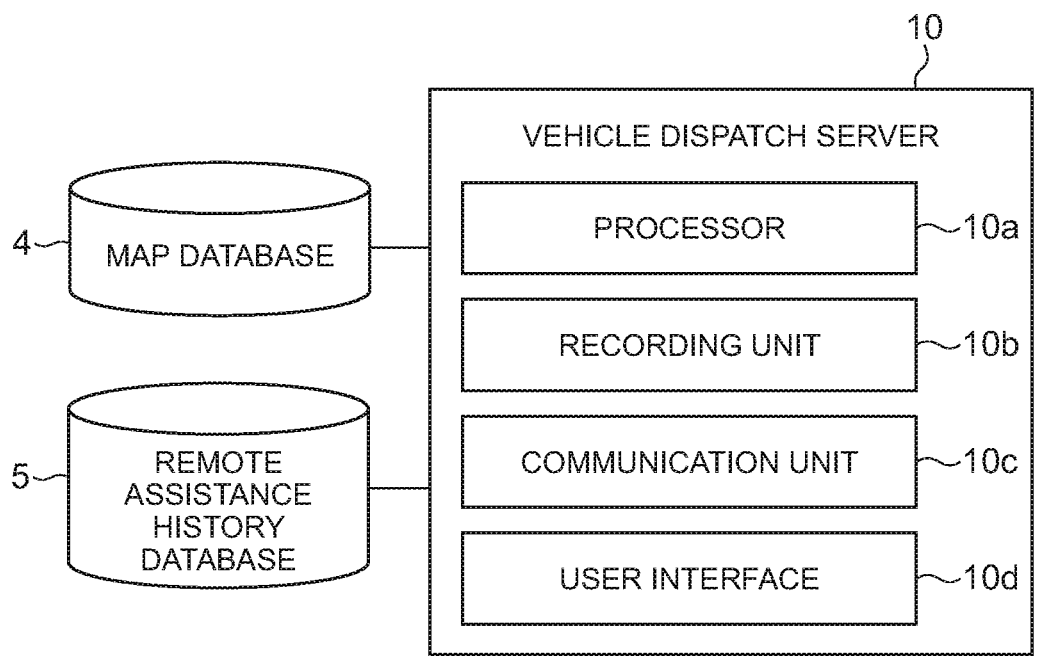
FIG. 4 is a block diagram illustrating an example of the hardware configuration of the vehicle dispatch server.

Next, the configuration of the vehicle dispatch server 10 will be described. FIG. 4 is a block diagram illustrating an example of the hardware configuration of the vehicle dispatch server 10. The map database 4 and the remote assistance history database 5 are connected to the vehicle dispatch server 10.

The map database 4 is a database for recording map information. The map information includes road position information, road shape information (e.g., curvature information), position information of intersections and branch points, and the like. More detailed map information than the map database 24 of the autonomous driving vehicle may be stored in the map database 4.

The remote assistance history database 5 is a database for recording the history of the request frequency for which the remote assistance is requested from the autonomous driving vehicle 2. The remote assistance history database 5 may also record the contents of the remote assistance performed by the remote operator R.

In the remote assistance history database 5, for example, the request frequency of the remote assistance is recorded for each section of the lane. There is no particular limitation on how the section is determined. The request frequency of the remote assistance for each section may be the frequency at which the remote assistance is requested to lane change to avoid approaching a vehicle parked on the shoulder of the section. The request frequency of the remote assistance for each section may be the frequency at which the remote assistance is requested to lane change to avoid an offset exceeding the oncoming lane. The higher the probability of a parking vehicle or the like being present, the higher the frequency of requests for remote assistance. The request frequency of the remote assistance for each section of the lane may be the number of requests of the remote assistance for the number of times the autonomous driving vehicle 2 has traveled in the section.

The remote assistance history database 5 may record the request frequency of the autonomous driving vehicle 2 when turning right at each intersection. When the autonomous driving vehicle 2 has a function of automatically turning right at an intersection without requesting remote assistance under certain conditions (for example, when an oncoming vehicle is not detected) (self-determination right turn function), a remote assistance request is not always made at the time of turning right at the intersection. The higher the traffic volume of the vehicle and the higher the probability of waiting for an oncoming vehicle when turning right at the intersection, the higher the frequency of requests when turning right at the intersection. The request frequency of the remote assistance at the time of turning right at the intersection can be, for example, the number of requests of the remote assistance out of the number of times of turning right at the intersection of the autonomous driving vehicle 2.

The request frequency described above may be recorded in association with time. The request frequency is recorded in association with time zones such as early morning, daytime, evening, and night. The request frequency may be recorded in association with traffic information such as vehicle density, or may be recorded in association with weather.

As illustrated in FIG. 4, the vehicle dispatch server 10 is configuration as a general computer having a processor 10a, a recording unit 10b, a communication unit 10c, and a user interface 10d. In this case, the user means a user (administrator or the like) of the vehicle dispatch server 10.

T The processor 10a controls the vehicle dispatch server 10 by operating various operating systems. The processor 10a is an arithmetic unit such as a CPU including a control unit, an arithmetic unit, a register, etc. The processor 10a integrates the recording unit 10b, the communication unit 10c, and the user interface 10d. The recording unit 10b includes at least one of a memory and a storage. The memory is a recording medium such as ROM or RAM. The storage is a recording medium such as an HDD.

The communication unit 10c is a communication device for performing communication via the wireless communication network N. The communication unit 10c may be a network device, a network controller, a network card, or the like. The user interface 10d is an input/output unit of the vehicle dispatch server 10 for a user such as an administrator. The user interface 10d includes an output device such as a display, a speaker, and an input device such as a touch panel. The vehicle dispatch server 10 is not necessarily provided in the facility, and may be mounted on a moving body such as a vehicle.

Figure 5:
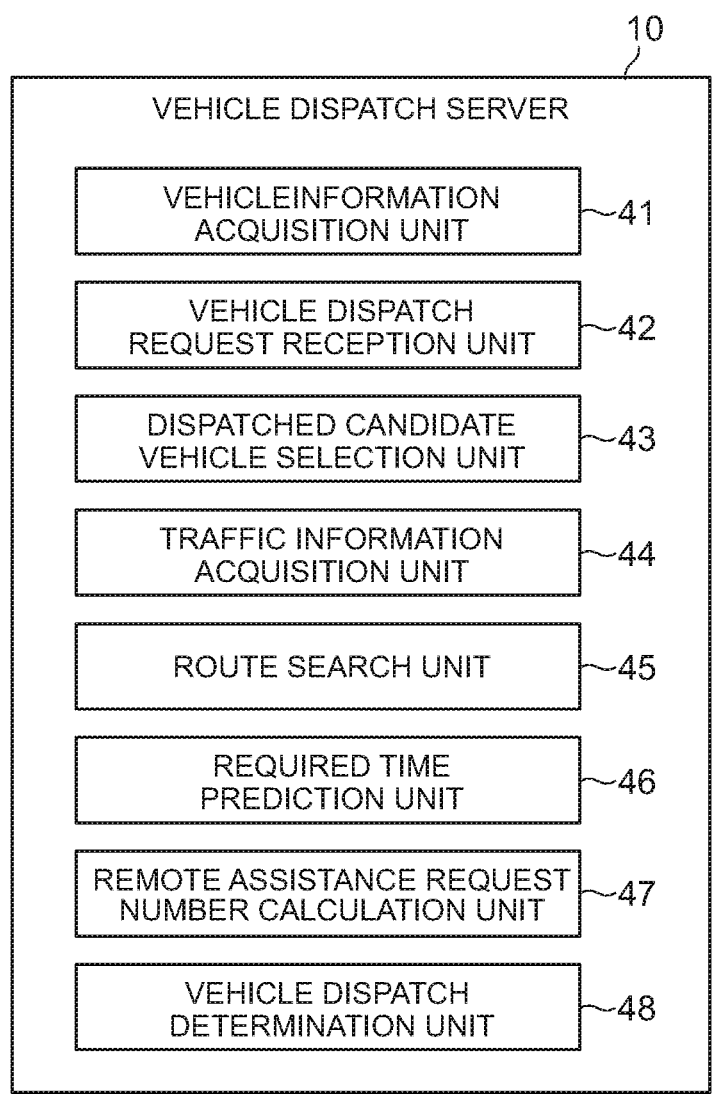
FIG. 5 is a block diagram illustrating an example of the functional configuration of the vehicle dispatch server.

Next, the functional configuration of the vehicle dispatch server 10 will be described. FIG. 5 is a block diagram illustrating an example of the functional configuration of the vehicle dispatch server 10. As illustrated in FIG. 5, the vehicle dispatch server 10 includes a vehicle information acquisition unit 41, a vehicle dispatch request reception unit 42, a dispatched candidate vehicle selection unit 43, a traffic information acquisition unit 44, a route search unit 45, a required time prediction unit 46, a remote assistance request number calculation unit 47, and a vehicle dispatch route determination unit 48.

The vehicle information acquisition unit 41 acquires vehicle information from the autonomous driving vehicle 2, which is an object of dispatch. The object of dispatch may include all autonomous driving vehicles 2 managed by the vehicle dispatch server 10, or may not include the autonomous driving vehicle 2 on which the user is on board. For example, when the user permits the sharing of the vehicle, the autonomous driving vehicle 2 in which the user is on the vehicle may be included in the object of dispatch.

The vehicle information acquisition unit 41 may acquire the vehicle information by issuing an information provision instruction to a plurality of the autonomous driving vehicles 2 to be dispatched, or may acquire the vehicle information by transmitting the vehicle information from the autonomous driving vehicles 2 at regular intervals.

The vehicle dispatch request receiving unit 42 receives a vehicle dispatch request from the user. The vehicle dispatch request may be transmitted from the user terminal 50. The vehicle dispatch request may be made from a server or the like for reserving the vehicle dispatch. The vehicle dispatch request may be a ride request for a user to ride, or a pickup request for a user to request delivery of a parcel. The request for dispatching a vehicle may be a request for specifying the time of advance reservation. The vehicle dispatch request may include at least one of information for specifying the number of passengers, information for specifying the type of vehicle, information for specifying the new vehicle, and information for specifying the color of the vehicle.

The vehicle dispatch request receiving unit 42 sets the point of dispatch P for dispatching autonomous driving vehicle 2 based on the received vehicle dispatch request. The point of dispatch P is a boarding point for a user to board if the type of the received vehicle dispatch request is a boarding request. The point of dispatch P is a pickup point for the user to deposit the luggage at the autonomous driving vehicle 2 when the type of the received vehicle dispatch request is a pickup request. The point of dispatch P may be determined by the user's designation, or may be set based on the position information of the user terminal 60 from a plurality of possible boarding points set in advance on the map. There is no particular limitation on how to decide the point of dispatch P.

The dispatched candidate vehicle selection unit 43 will select a dispatched candidate vehicle. The dispatched candidate vehicle is a candidate vehicle to be dispatched to the point of dispatch P. The dispatched candidate vehicle selection unit 43 selects multiple dispatched candidate vehicles based on the location of the point of dispatch P and the position of the autonomous driving vehicle 2. The dispatched candidate vehicle selection unit 43 selects, for example, the autonomous driving vehicle 2 located within a certain distance from the point of dispatch P as the dispatched candidate vehicle.

The dispatched candidate vehicle selection unit 43 may set the maximum number of dispatched candidate vehicles. When the number of the autonomous driving vehicle 2s located within a certain distance from the point of dispatch P exceeds a predetermined upper limit, the number of dispatched candidate vehicles is limited to be equal to or less than the upper limit. The dispatched candidate vehicle selection unit 43 may select the dispatched candidate vehicle in order of proximity to point of dispatch P, thereby narrowing down the number of dispatched candidate vehicle to be equal to or less than the upper limit of the number. The upper limit of the number is two or more.

Alternatively, the dispatched candidate vehicle selection unit 43 may be configured to select the dispatched candidate vehicle up to the upper limit of the number of units in order of proximity to the point of dispatch P. The dispatched candidate vehicle selection unit 43 may use the distance on the road instead of the linear distance. The autonomous driving vehicle 2 may exclude from dispatched candidate vehicle that is not within the same area as the point of dispatch P. The area is a preset area on the map. The area may be a city, town or village on the map.

The dispatched candidate vehicle selection unit 43 may execute narrowing-down of the dispatched candidate vehicle based on the remaining fuel of the autonomous driving vehicle 2 or the mileage of the autonomous driving vehicle 2. For example, the dispatched candidate vehicle selection unit 43 excludes from dispatched candidate vehicle the autonomous driving vehicle 2 where the remaining fuel is less than the remaining fuel threshold or where the mileage is less than the mileage threshold. Hereinafter, the threshold values used in the description including the residual fuel threshold value and the drivable distance threshold value mean threshold values of predetermined values.

The dispatched candidate vehicle selection unit 43 selects the autonomous driving vehicle 2 as dispatched candidate vehicle along the condition by user if at least one of the information for specifying the number of passengers, the information for specifying the type of vehicle, the information for specifying the new vehicle, the color of the vehicle, and the like is included in the vehicle dispatch request.

The traffic information acquisition unit 44 acquires traffic information to be used for determining a vehicle dispatch route. The traffic information includes, for example, vehicle density. The traffic information may include congestion information. The traffic information may include information on road construction sections. The traffic information acquisition unit 44 may acquire traffic information around the dispatched candidate vehicle by acquiring vehicle information from the dispatched candidate vehicle. The traffic information acquisition unit 44 may acquire traffic information around the point of dispatch P by communication with a public organization or a private traffic information aggregation server. The traffic information acquisition unit 44 may acquire traffic information around the point of dispatch P by providing information from the autonomous driving vehicle 2 running in the vicinity of the point of dispatch P (for example, the autonomous driving vehicle not subject to the dispatch while the user is on board).

The route search unit 45 searches for a route for the dispatched candidate vehicle to get to the point of dispatch P. The route search unit 45 searches at least one route per dispatched candidate vehicle. The route search unit 45 may perform a route search based on the position information of the point of dispatch P and the dispatched candidate vehicle and the map information of the map database 4. The route search unit 45 may perform a route search by recognizing the travelling lane of dispatched candidate vehicle or the traveling direction of dispatched candidate vehicle.

The route search unit 45 may search for a plurality of the routes until the number of routes reaches a preset maximum in the order of the shortest route lengths. The route search method is not particularly limited, and the method of known can be adopted.

Figure 6:
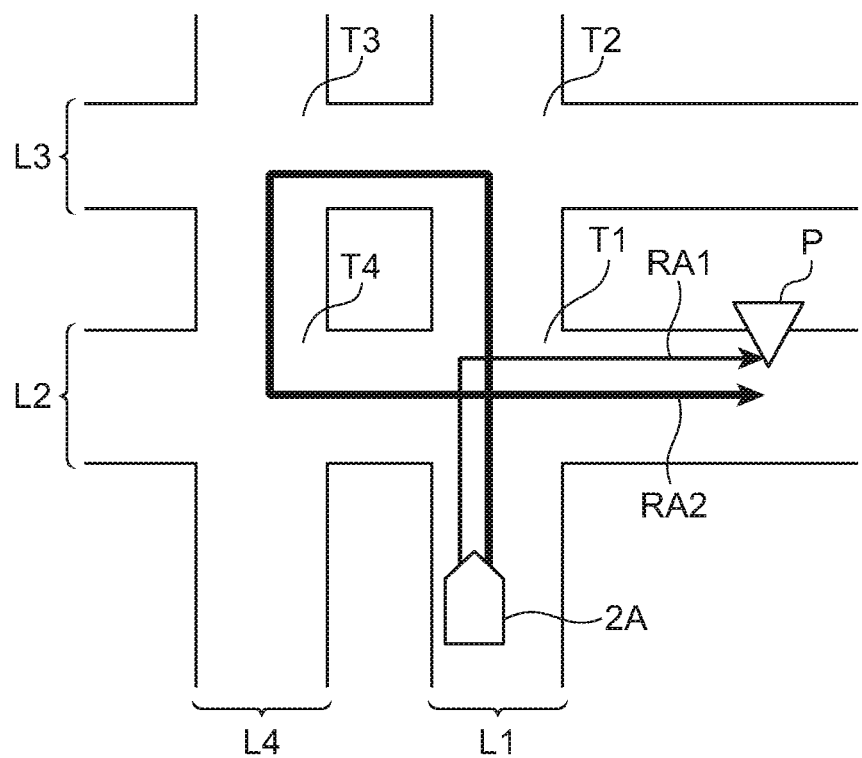
FIG. 6 is a diagram illustrating an example of a situation where a plurality of the routes of the dispatched candidate vehicle exist.

FIG. 6 is a diagram illustrating an example of a situation where a plurality of the routes of the dispatched candidate vehicle exist. FIG. 6 shows the dispatched candidate vehicle 2A, the dispatched candidate vehicle 2B, the point of dispatch P, and the roads L1-L4. The roads L1-L4 are arranged in a grid pattern and form four intersections T1-T4. The road L1 is a road on which the dispatched candidate vehicle 2A is running, and intersects the road L2 at the intersection T1 and also intersects the road L3 at the intersection T2 located in the back of the intersection T1. The road L2 intersects the road L4 (a road extending in parallel with the road L1) at the intersection T1, and intersects the road L1 at the intersection T1. The point of dispatch P is located on the right side of the dispatched candidate vehicle 2A on the road L2. The road L3 intersects the road L4 at the intersection T4 and intersects the road L1 at the intersection T1.

In the situation illustrated in FIG. 6, the route search unit 45 searches the route RA1 and the route RA2 as the route by which the dispatched candidate vehicle 2A reaches the point of dispatch P. The route RA1 is a route from the road L1 to the point of dispatch P on the road L2 by turning right at the intersection T1. The route RA2 is a route that goes straight through the intersection T1, turns left at the intersection T2, and proceeds on the road L3, then turns left at the intersection T3 and proceeds on the road L4, and then turns left at the intersection T4 to enter the road L2, and goes straight through the intersection T1 to arrive at the point of dispatch P.

The required time prediction unit 46 predicts the required time by the route searched by the route search unit 45. The required time prediction unit 46 predicts the required time for each route when a plurality of the routes is searched.

The required time prediction unit 46 predicts the required time until the dispatched candidate vehicle arrives at the point of dispatch P when the vehicle travels at a constant speed, for example, based on the length of the route. In the situation illustrated in FIG. 6, the required time prediction unit 46 predicts that the required time of the route RA1 is shorter than the required time of the route RA2.

The required time prediction unit 46 may predict the required time by adding the addition time set in advance for each event such as turning right at the intersection of the route, passing through the traffic light, crossing the railroad crossing based on the map information. The required time prediction unit 46 may set the addition time such as turning right at the intersection to a different time depending on the position on the map. For example, in the situation illustrated in FIG. 6, when the intersection T1 is an intersection without a traffic light having a large traffic volume on the road L1 and the addition time due to the right turn of the intersection is set as a large time, the required time prediction unit 46 predicts that the required time of the route RA1 is longer than the required time of the route RA2.

The required time prediction unit 46 may predict the required time based on the trajectory (route and vehicle speed plan) of the autonomous driving for each route. The trajectory of the autonomous driving is generated, for example, by the trajectory generation unit 37 at the dispatched candidate vehicle. The trajectory generation unit 37 generates the trajectory of the autonomous driving based on the route, the point of dispatch P, the map information, the external environment of the autonomous driving vehicle, and the running state of the autonomous driving vehicle.

Instead of the dispatched candidate vehicle, a trajectory of autonomous driving may be generated at the vehicle dispatch server 10. In this case, the required time prediction unit 46 predicts the required time based on the trajectory of the autonomous driving for each route generated at the vehicle dispatch server 10. The path of the autonomous driving generated at the vehicle dispatch server 10 does not necessarily need to be used for the actual autonomous driving at the dispatched candidate vehicle. Alternatively, the trajectory may be generated at other servers instead of the vehicle dispatch server 10.

The method of predicting the required time is not particularly limited, and the method of known can be adopted. For the prediction of the required time, the prediction result of the machine learning based on various travel histories of the autonomous driving vehicle 2 in the past may be used.

The remote assistance request number calculation unit 47 calculates the number of remote assistance requests on the route, which is the number of remote assistance requests that the dispatched candidate vehicle requests the remote operator R for remote assistance, based on the route and the previously set remote assistance request conditions.

The remote assistance request condition is a condition that the dispatched candidate vehicle requests remote assistance from the remote operator R. The remote assistance request condition is satisfied when the remote assistance request determination unit 36 determines that the dispatched candidate vehicle (the autonomous driving vehicle 2) is in the remote assistance request status. In the remote assistance request condition, an event such as a lane change on the route may be associated with a count of the number of remote assistance requests.

For example, the remote assistance request number calculation unit 47 counts one remote assistance request number on the route when a lane change is performed on a route. The case where the lane change is carried out in the route is, for example, a case where the lane change from the left lane to the right lane is required in a multi-lane road in order to arrive at the point of dispatch P.

The remote assistance request number calculation unit 47 may count one remote assistance request number on the route when turning right at an intersection on a route. The remote assistance request number calculation unit 47 may count one remote assistance request number of the route RA2 for making right turns at the intersection. In the situation illustrated in FIG. 6, the remote assistance request number calculation unit 47 may count remote assistance request number of the route RA1 for one right turn at the intersection as "1". The remote assistance request number calculation unit 47 may count remote assistance request number of the route RA2 without making a right turn at the intersection as "0".

The remote assistance request number calculation unit 47 does not necessarily have to count one remote assistance request number when the dispatched candidate vehicle has a self-determination right turn function of turning right at an intersection without requesting remote assistance under a certain condition. The remote assistance request number calculation unit 47 may count the number of remote assistance requests by 0.5 or by 0.7 in consideration of the possibility of remote assistance being requested.

The remote assistance request number calculation unit 47 may determine the count number of the remote assistance requests at the intersection right turn by using the traffic information in the vicinity of the intersection acquired by the traffic information acquisition unit 44. In this case, the route includes position information on the map. For example, the remote assistance request number calculation unit 47 may count the number of remote assistance requests at the right turn of the intersection as a larger value as the vehicle density near the intersection is larger. Alternatively, the remote assistance request number calculation unit 47 may count the number of remote assistance requests at the right turn of the intersection as a larger value than when the vehicle density in the vicinity of the intersection is less than the density threshold when the vehicle density in the vicinity of the intersection is equal to or greater than the density threshold. Here, it is assumed that the count of the number of remote assistance requests for one event is "1" at the maximum.

The remote assistance request number calculation unit 47 may count the number of remote assistance requests at the intersection turn using the request frequency of the remote assistance stored in the remote assistance history database 5. When the dispatched candidate vehicle has the self-determination right turn function, the remote-assistance request number calculation unit 47 may set the count number of the remote-assistance requests at the right turn of the intersection to a larger value as the request frequency of the remote assistance at the time of turning the intersection, which is recorded in association with the intersection to be turned right on the route, is larger.

Alternatively, the remote assistance request number calculating unit 47 may count the number of the remote assistance requests at the time of turning right at the intersection as a larger value than when the request frequency of the remote assistance at the time of turning right at the intersection is less than the right turn request threshold when the request frequency of the remote assistance at the time of turning right at the intersection is equal to or greater than the right turn request threshold.

The remote assistance request number calculation unit 47 may count the number of remote assistance requests using both the traffic information in the vicinity of the intersection acquired by the traffic information acquisition unit 44 and the request frequency of the remote assistance stored in the remote assistance history database 5.

The remote assistance request number calculation unit 47 may calculate the count number of the remote assistance requests at the right turn of the intersection by increasing or decreasing the count number of the remote assistance requests at the right turn of the intersection, which is obtained from the remote assistance request frequency, in consideration of the influence of the traffic information (vehicle density, etc.). Alternatively, when the request frequency of the remote assistance is recorded in the remote assistance history database 5 in association with the traffic information, the remote assistance request number calculation unit 47 can calculate the count number of the remote assistance request number from the request frequency of the remote assistance at the right turn of the intersection more accurately extracted based on the traffic information by referring to the traffic information in the vicinity of the current intersection.

The remote assistance request number calculation unit 47 may count the number of remote assistance requests in the section of the lane using the request frequency of the remote assistance stored in the remote assistance history database 5. The remote-assistance request number calculation unit 47 may count the number of remote assistance requests in a section included in the route as a larger value as the request frequency of the remote assistance in the section is higher. Alternatively, when the request frequency of the remote assistance in the section of the lane included in the route is equal to or greater than the section request threshold, the remote assistance request number calculation unit 47 may count the number of remote assistance requests in the section as a larger value than when the request frequency of the remote assistance in the section of the lane is less than the section request threshold.

The remote assistance request number calculation unit 47 may count the number of remote assistance requests by referring to the map information. The remote assistance request number calculation unit 47 may count one remote assistance request number when, for example, there is a traffic signal passing on the route (straight ahead or left at an intersection). The remote assistance request number calculation unit 47 may count one remote assistance request number when there is a railroad crossing on the route. The remote assistance request number calculation unit 47 may count one remote assistance request number when there is a construction section on the route. How to count the number of remote assistance requests can be arbitrarily set as a remote assistance request condition.

The vehicle dispatch determination unit 48 determines the dispatch route for the point of dispatch P and a dispatch vehicle to the point of dispatch P. When there is only one dispatched candidate vehicle selected by the dispatched candidate vehicle selection unit 43, the vehicle dispatch determination unit 48 determines the one dispatched candidate vehicle as the dispatch vehicle. The vehicle dispatch determination unit 48 determines that the autonomous driving vehicle 2 having the baggage is a vehicle for dispatching a vehicle when the request for dispatching a vehicle is a request for receiving the baggage to be received by the user.

When there is only one route searched for by the route search unit 45, to dispatch route determination unit 48 determines the one route as the vehicle dispatch route for the dispatched candidate vehicle. The vehicle dispatch determination unit 48 transmits a vehicle dispatch instruction including the vehicle dispatch route to the dispatched candidate vehicle.

The vehicle dispatch determination unit 48 may determine the dispatch route of the dispatched candidate vehicle based on the required time of each route and the number of remote assistance requests of each route, when there is only one dispatched candidate vehicle selected by the dispatched candidate vehicle selection unit 43 and a plurality of the routes has been searched for by the route search unit 45. The vehicle dispatch determination unit 48 transmits a vehicle dispatch instruction including the vehicle dispatch route to the dispatched candidate vehicle. The vehicle dispatch determination unit 48 may notify the user terminal 50 of the location information of the dispatch vehicle and the required time.

The vehicle dispatch determination unit 48 narrows down, for example, only routes whose required time is less than the first time-threshold and whose number of remote assistance requests is less than the first request-threshold. The vehicle dispatch determination unit 48 determines, as a vehicle dispatch route, a route having the smallest number of remote assistance requests among the remaining routes. For example, in the situation illustrated in FIG. 6, when the required time for both the route RA1 and the route RA2 is less than the first time-threshold, The vehicle dispatch determination unit 48 determines the route RA2, which is not the route RA1 having the number of remote assistance requests of "1" but has the number of remote assistance requests of "0" even if it is a little detour, as the vehicle dispatch route. When there are a plurality of the routes having the smallest number of remote assistance requests, the vehicle dispatch determination unit 48 determines the route having the smallest required time as the vehicle dispatch route.

When no route remains in the route narrowing, the vehicle dispatch determination unit 48 may relax the threshold condition. The vehicle dispatch determination unit 48 changes, for example, the first time-threshold for the required time or the first request-threshold for the number of remote assistance requests to a large value. Alternatively, the vehicle dispatch determination unit 48 may eliminate the requirement of the threshold value of the required time or the number of remote assistance requests. The vehicle dispatch determination unit 48 repeats the relaxation of the threshold condition until the route remains. Thereafter, the vehicle dispatch determination unit 48 determines the route having the smallest number of remote assistance requests as the vehicle dispatch route among the remaining routes. The route determination unit 48 does not necessarily perform route narrowing.

It is not always necessary to use the route with the smallest number of remote assistance requests as the dispatch route. The vehicle dispatch determination unit 48 may determine a route having the least required time as a vehicle dispatch route. In this case, for example, in the situation illustrated in FIG. 6, The vehicle dispatch determination unit 48 determines the route RA2, which requires a shorter time than the route RA1, as the vehicle dispatch route. When there are a plurality of the routes having the least required time, the vehicle dispatch determination unit 48 determines the route having the least number of remote assistance requests as the vehicle dispatch route.

The vehicle dispatch determination unit 48 may change the method of determining the vehicle dispatch route according to the type of the vehicle dispatch request. For example, when the vehicle dispatch request is a ride request for a user to ride, The vehicle dispatch determination unit 48 may determine the route having the least required time as the vehicle dispatch route with priority given to the small required time. When the vehicle dispatch request is a pickup request for the user's baggage delivery request, the vehicle dispatch determination unit 48 may determine the route having the smallest number of remote assistance requests as the vehicle dispatch route, giving priority to the small number of remote assistance requests. When the vehicle dispatch request is a time specification, the vehicle dispatch determination unit 48 may determine the route having the smallest number of remote assistance requests as the vehicle dispatch route regardless of the type of the vehicle dispatch request.

The dispatch route determination unit 48 may postpone the determination of the dispatch route from the plurality of the routes to the route branch point. For example, in the case where the section where the dispatched candidate vehicle reaches the route branch point is common to all the routes, the vehicle dispatch determination unit 48 postpones the determination of the vehicle dispatch route until the dispatched candidate vehicle reaches the route branch point. A route branch point is a point at which a plurality of the routes branch. For example, a route branch point is an intersection.

The vehicle dispatch determination unit 48 determines whether or not the dispatched candidate vehicle has reached the route branch point based on the map information and the position information of the dispatched candidate vehicle. Reaching the route branch point may mean that the dispatched candidate vehicle enters the intersection which is the route branch point, or that the dispatched candidate vehicle reaches a point a certain distance before the route branch point. The certain distance is not particularly limited. The certain distance may be 1 m or 3 m. The point before a certain distance may be the position of the temporary stop line at the entrance of the intersection.

Figure 7:
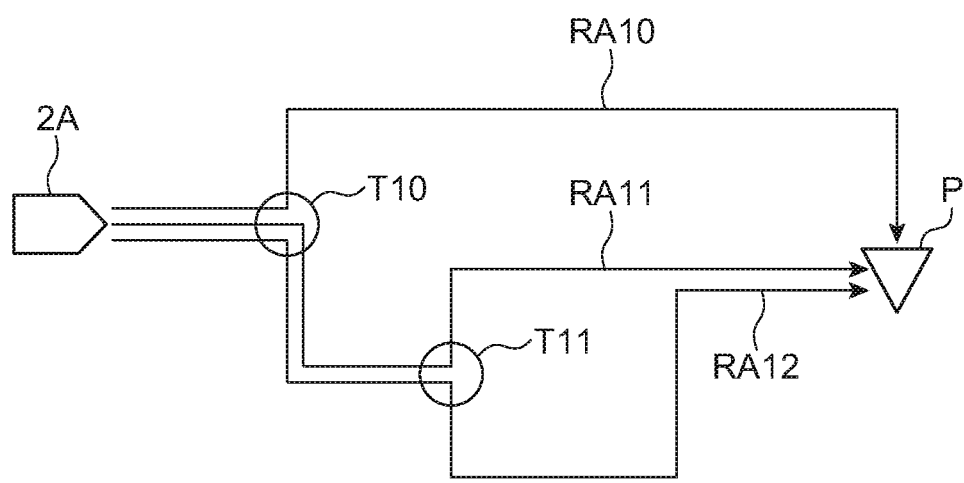
FIG. 7 is a diagram illustrating for explaining the postponement of determination of vehicle dispatch route to the route branch point.

FIG. 7 is a diagram illustrating for explaining the postponement of determination of vehicle dispatch route to the route branch point. FIG. 7 shows the dispatched candidate vehicle 2A, route RA10, route RA11, route RA12, route branch point T10, route branch point T11, and the point of dispatch P. The route branch point T10 and the route branch point T11 are, for example, T-junctions. At the route branch point T10, the route RA10 branches to the right, and the routes RA11 and RA12 branch to the left. At the route branch point T11, the route RA11 branches to the right and the route RA12 branches to the left.

In the situation illustrated in FIG. 7, the dispatch route determination unit 48 may postpone the determination of the dispatch route until the dispatched candidate vehicle 2A reaches the route branch point T10. For example, when the dispatched candidate vehicle 2A reaches the route branch point T10, the traffic information in the vicinity of the route branch point T10 can be acquired from the dispatched candidate vehicle 2A, and the prediction accuracy of the required time by the required time prediction unit 46 can be improved using the traffic information. The vehicle dispatch determination unit 48 determines the vehicle dispatch route using the required time newly predicted for each route (route RA10, route RA11, and route RA12). It is to be noted that the acquisition of the traffic information from the dispatched candidate vehicle 2A is not necessarily required, and the accuracy of the prediction of the required time by the required time prediction unit 46 can be improved by using the latest traffic information obtained by the elapse of time. Further, since the remaining length of each route up to the point of dispatch P is shortened by the amount of travel of dispatched candidate vehicle, it is possible to improve the prediction accuracy of the required time as compared with the case of not postpone.

If the route RA10 is not determined to be the dispatch route even when the dispatched candidate vehicle 2A reaches the route branch point T10 (if the route RA11 or the route RA12 is a candidate for the dispatch route), the dispatch route determination unit 48 may postpone the determination of the dispatch route until the dispatched candidate vehicle 2A reaches the next route branch point T11. The vehicle dispatch determination unit 48 may determine the vehicle dispatch route from the route RA11 and the route RA12 by using the required time newly predicted when the dispatched candidate vehicle 2A reaches the next route branch point T11.

When there is a plurality of the dispatched candidate vehicles selected by the dispatched candidate vehicle selection unit 43, the vehicle dispatch determination unit 48 determines the dispatch route as in the case where there is only one the dispatched candidate vehicle, thereby determining the dispatched candidate vehicle having the dispatch route as the dispatch vehicle. the vehicle dispatch determination unit 48 sends a dispatch instruction including a dispatch route to the dispatch vehicle. The vehicle dispatch determination unit 48 may notify the user terminal 50 of the location information of the dispatch vehicle and the required time.

The vehicle dispatch determination unit 48 may narrow down to only those routes in which the required time is less than the second time-threshold and the number of remote assistance requests is less than the second request-threshold among all the routes of the dispatched candidate vehicles. The second time-threshold value may be a threshold value equal to or different from the first time-threshold value of only one dispatched candidate vehicle. The second request-threshold value may be a threshold value equal to or different from the first request-threshold value of only one dispatched candidate vehicle. When there is no route left in the route narrowing, the vehicle dispatch determination unit 48 may relax the threshold condition as in the case where there is only one dispatched candidate vehicle.

The vehicle dispatch determination unit 48 may change the values of the second time-threshold and/or the second request-threshold for each dispatched candidate vehicles. The vehicle dispatch determination unit 48 may set the second time threshold value to a larger value as the distance from the point of dispatch P is greater at the dispatched candidate vehicle. As a result, it is possible to find the dispatched candidate vehicle that has a route with a small number of remote assistance requests even if it is far from the point of dispatch P. The route determination unit 48 does not necessarily perform route narrowing.

The vehicle dispatch determination unit 48 may change the value of the second request-threshold value based on the number of working people of the remote operator R (the number of remote assistance requests that can be handled). When the number of workers of the remote operator R is sufficiently large, the required time can be given priority without imposing a load on the remote operator R. The vehicle dispatch determination unit 48 may set the second request-threshold value to a larger value as the number of workers of the remote operator R increases. The vehicle dispatch determination unit 48 may change the second request-threshold value according to the change in the number of working people of the remote operator R (the change in the number of remote assistance requests that can be handled over time).

The vehicle dispatch determination unit 48 determines the route with the smallest the remote assistance request number as the dispatch route among the routes remaining after the narrowing down. The vehicle dispatch determination unit 48 may determine the route having the shortest required time among the routes remaining after the narrowing down as the dispatch route. The vehicle dispatch determination unit 48 determines that the dispatched candidate vehicle, which has the dispatch route, is the dispatch vehicle for the point of dispatch P.

Figure 8:
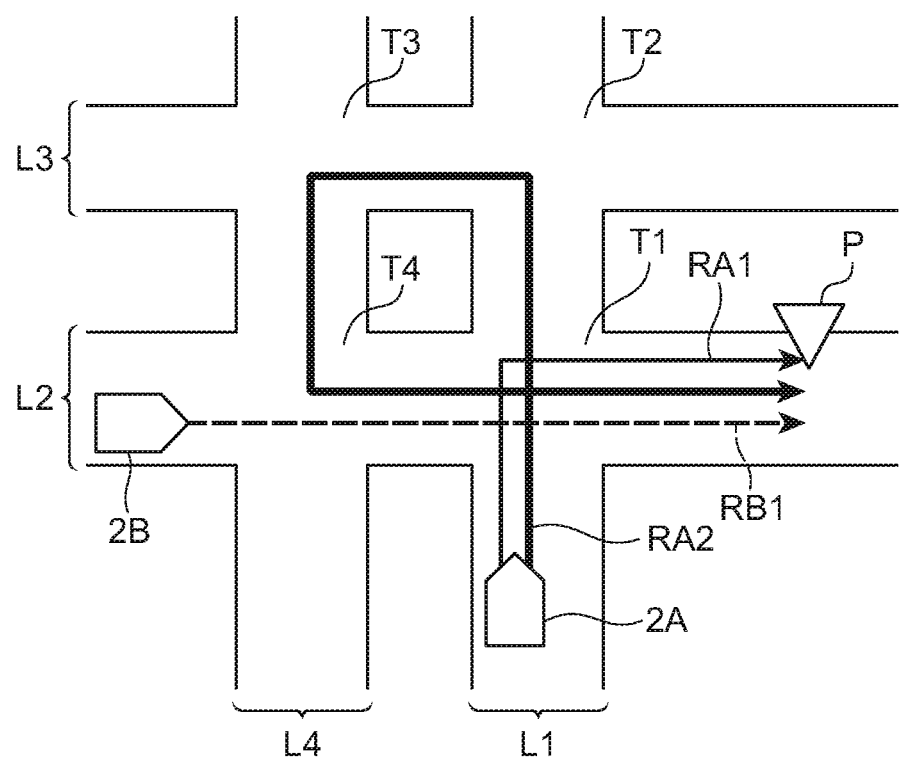
FIG. 8 is a diagram illustrating an example of a situation where a plurality of the dispatched candidate vehicles exists.

FIG. 8 is a diagram showing an example of a situation where a plurality of the dispatched candidate vehicles exists. FIG. 8 shows the route RB1 of the dispatched candidate vehicle 2B and the dispatched candidate vehicle 2B (the rest of the route RB2 is the same as that of FIG. 6, and the description thereof is omitted). The dispatched candidate vehicle 2B is a vehicle running on road L2. The route RB1 is a route to go straight through the intersection T4 and the intersection T1 on the road L2 and arrive at the point of dispatch P. In the route RB1, since there is no right turn at the intersection, the remote assistance request number is "0", and the required time is shorter than that of the route RA1 and the route RA2. The route RA1, the route RA2, and the route RB1 satisfy the condition of narrowing down.

In the situation illustrated in FIG. 8, the vehicle dispatch determination unit 48 determines the dispatch route from the routes RA1 and RA2 of the dispatched candidate vehicle 2A and the route RB1 of the dispatched candidate vehicle 2B. The vehicle dispatch determination unit 48 may determine the route RB1 as the dispatch route when giving priority to the small required time. The vehicle dispatch determination unit 48 determines the dispatched candidate vehicle 2B having the route RB1 as the dispatch vehicle.

The vehicle dispatch determination unit 48 extracts the route RA2 and RB1 where the remote assistance request number is "0", when it gives priority to the small number of the remote assistance request number.

The vehicle dispatch determination unit 48 determines the route RB1 having the shortest required time as the dispatch route, paying attention to the required time, when there is a plurality of the routes in which the remote assistance request number is "0". The vehicle dispatch determination unit 48 determines the dispatched candidate vehicle 2B having the route RB1 as the dispatch vehicle.

As in the case where only one the dispatched candidate vehicle is used, the vehicle dispatch determination unit 48 may change the method of determining the vehicle dispatch route according to the type of the vehicle dispatch request. When the dispatch request is a time specification, the vehicle dispatch determination unit 48 may determine the route having the smallest the remote assistance request number as the dispatch route regardless of the type of the dispatch request.

Vehicle Dispatch Method of Vehicle Dispatch System

Figure 9:
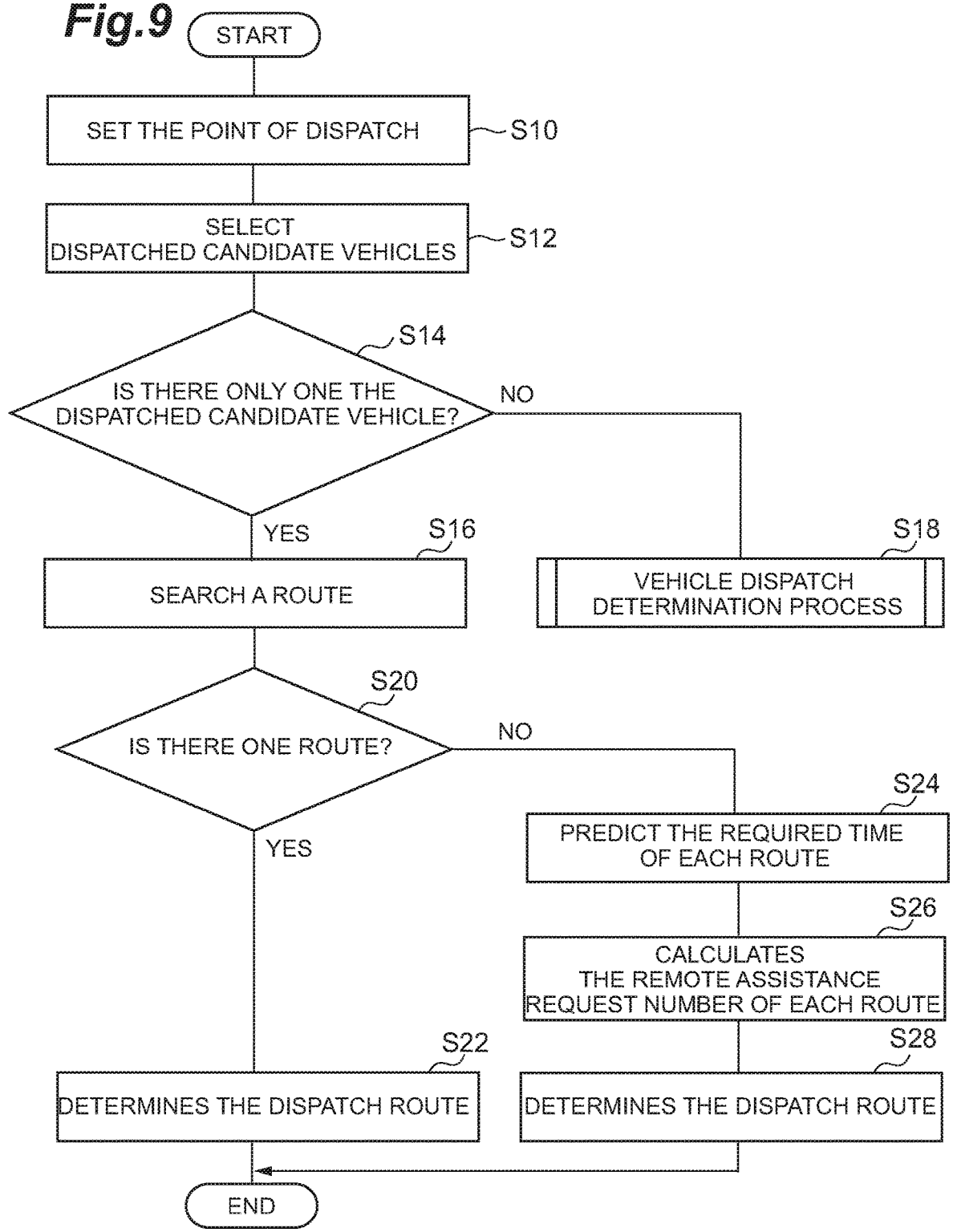
FIG. 9 is a flowchart illustrating an example of a vehicle dispatch route determination process.

Next, the vehicle dispatch method of the vehicle dispatch system 1 (the vehicle dispatch server 10) according to this embodiment will be described. FIG. 9 is a flowchart illustrating an example of a vehicle dispatch route determination process. The vehicle dispatch route determination process may be executed when a vehicle dispatch request is received by the vehicle dispatch request reception unit 42. The vehicle dispatch route determination process may be started when a vehicle dispatch request with a specified time is received, and when a predetermined time elapses from the specified time.

As illustrated in FIG. 9, the vehicle dispatch server 10 of vehicle dispatch system 1 sets the point of dispatch P by the vehicle dispatch request receiving unit 42 in S10 (point of dispatch setting step). The vehicle dispatch request receiving unit 42 may set a point closest to the position of the user terminal 50 as point of dispatch P from among a plurality of possible boarding points set in advance on the map based on the position information of the user terminal 50.

In S12, the vehicle dispatch server 10 selects dispatched candidate vehicles by the dispatched candidate vehicle selection unit 43 (dispatched candidate vehicle selection step). The dispatched candidate vehicle selection unit 43 selects the dispatched candidate vehicle based on the location of the point of dispatch P and the autonomous driving vehicle 2. The dispatched candidate vehicle selection unit 43 selects, for example, the autonomous driving vehicle 2 located within a certain distance from the point of dispatch P as the dispatched candidate vehicle dispatched candidate vehicle selection unit 43 selects the dispatched candidate vehicle. When the vehicle dispatch request is a baggage receiving request for the user to receive the baggage, S12 and S14 are omitted and the process proceeds to S16.

In S14, the vehicle dispatch server 10 determines whether or not there is only one the dispatched candidate vehicle by the vehicle dispatch determination unit 48 (number of dispatched candidate vehicle determination step). When it is determined that there is only one the dispatched candidate vehicle (YES in S14), the process proceeds to S16. the vehicle dispatch determination unit 48 determines that the dispatched candidate vehicle is the vehicle being dispatched. If it is not determined that there is only one the dispatched candidate vehicle (NO in S14), the process proceeds to S18. The vehicle dispatch determination process in S18 will be described later.

In S16, the vehicle dispatch server 10 searches for a route for the dispatched candidate vehicle to reach the point of dispatch P by the route search unit 45 (route search step). The route search unit 45 performs a route search based on, for example, the position information of the point of dispatch P and the dispatched candidate vehicle and the map information of the map database 4. The route search step in S16 may be performed before the determination in S14.

In S20, the vehicle dispatch server 10 determines whether or not there is one route by the vehicle dispatch determination unit 48 (route determination step). When it is determined that there is only one route (YES in S20), the process proceeds to S22. If it is not determined that there is only one route (NO in S20), the process proceeds to S24.

In S22, the vehicle dispatch server 10 determines the vehicle dispatch route by the vehicle dispatch determination unit 48 (vehicle dispatch route determination step). The vehicle dispatch determination unit 48 is determined as a route determined to be one and a dispatch route. the vehicle dispatch determination unit 48 sends a dispatch instruction including a dispatch route to the dispatch vehicle. After that, the vehicle dispatch server 10 ends this process.

In S24, the vehicle dispatch server 10 predicts the required time of each route by the required time prediction unit 46 (required time prediction step). the required time prediction unit 46 may predict the required time based on the trajectory (route and vehicle speed plan) of the autonomous driving for each route.

In S26, the vehicle dispatch server 10 calculates the remote assistance request number of each route by the remote assistance request number calculation unit 47 (the remote assistance request number calculation step). The remote assistance request number calculation unit 47 calculates the remote assistance request number based at least on the route and the remote assistance request condition. The order of the process in S24 and the process in S26 may be reversed or may be performed simultaneously. When the remote assistance request number is calculated earlier, the required time prediction unit 46 may predict the required time based on the remote assistance request number.

In S28, the vehicle dispatch server 10 determines the dispatch route for the point of dispatch P by the vehicle dispatch determination unit 48 (dispatch route determination step). The vehicle dispatch determination unit 48 may narrow down to routes whose duration is less the first time-threshold and the remote assistance request number is less the first request-threshold. the vehicle dispatch determination unit 48 determines the route with the smallest the remote assistance request number among the remaining routes as the dispatch route. After that, the vehicle dispatch server 10 ends this process.

Figure 10:
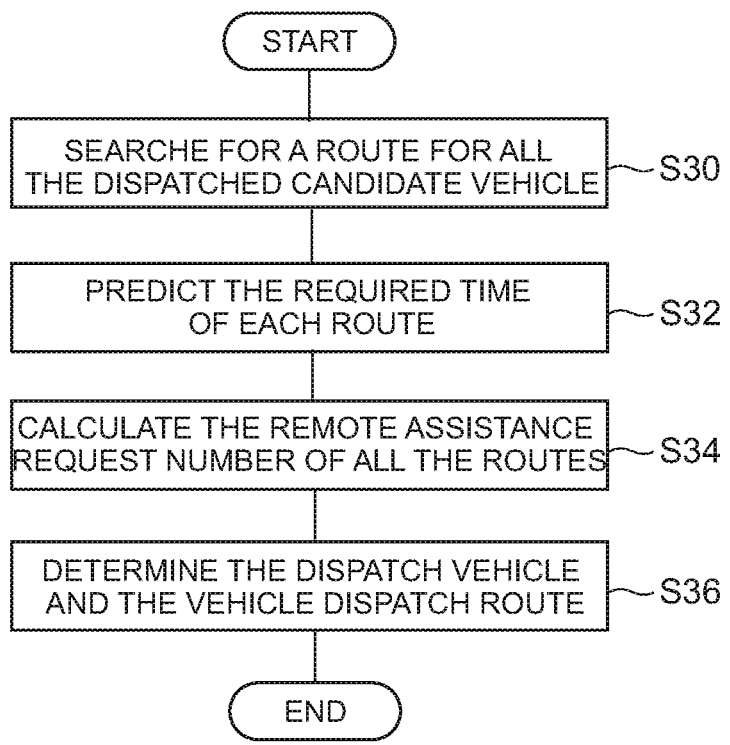
FIG. 10 is a flowchart illustrating an example of vehicle dispatch determination process.

FIG. 10 is a flowchart illustrating an example of vehicle dispatch determination process. The vehicle dispatch determination process shown in FIG. 10 corresponds to the process of S18 in FIG. 9.

As illustrated in FIG. 10, in S30, the vehicle dispatch server 10 searches for a route for all the dispatched candidate vehicle to reach the point of dispatch P by the route search unit 45 (route search step). the route search unit 45 searches for at least one route for each the dispatched candidate vehicle. The route search step may be performed before the determination in S14 in the flowchart of FIG. 9.

In S32, the vehicle dispatch server 10 predicts the required time of each route of all the dispatched candidate vehicles by the required time prediction unit 46 (required time prediction step). the required time prediction unit 46 may predict the required time based on the trajectory (route and vehicle speed plan) of the autonomous driving for each route.

In S34, the vehicle dispatch server 10 calculates the remote assistance request number of all the routes of the dispatched candidate vehicle by the remote assistance request number calculation unit 47 (the remote assistance request number calculation step). the remote assistance request number calculation unit 47 calculates the remote assistance request number based at least on the route and the remote assistance request condition. The order of the processing in S32 and the processing in S34 may be reversed, or may be performed simultaneously.

In S36, the vehicle dispatch server 10 determines the dispatch vehicle and vehicle dispatch route for the point of dispatch P by the vehicle dispatch determination unit 48 (dispatch vehicle determination step). The vehicle dispatch determination unit 48 may narrow down to only those routes in which the required time is less than the second time-threshold and the number of remote assistance requests is less than the second request-threshold among all the routes of the dispatched candidate vehicles. The vehicle dispatch determination unit 48 determines the route with the smallest the remote assistance request number as the dispatch route among the routes remaining after the narrowing down. The vehicle dispatch determination unit 48 determines that the dispatched candidate vehicle, which has the dispatch route, is the dispatch vehicle for the point of dispatch P.

Figure 11:
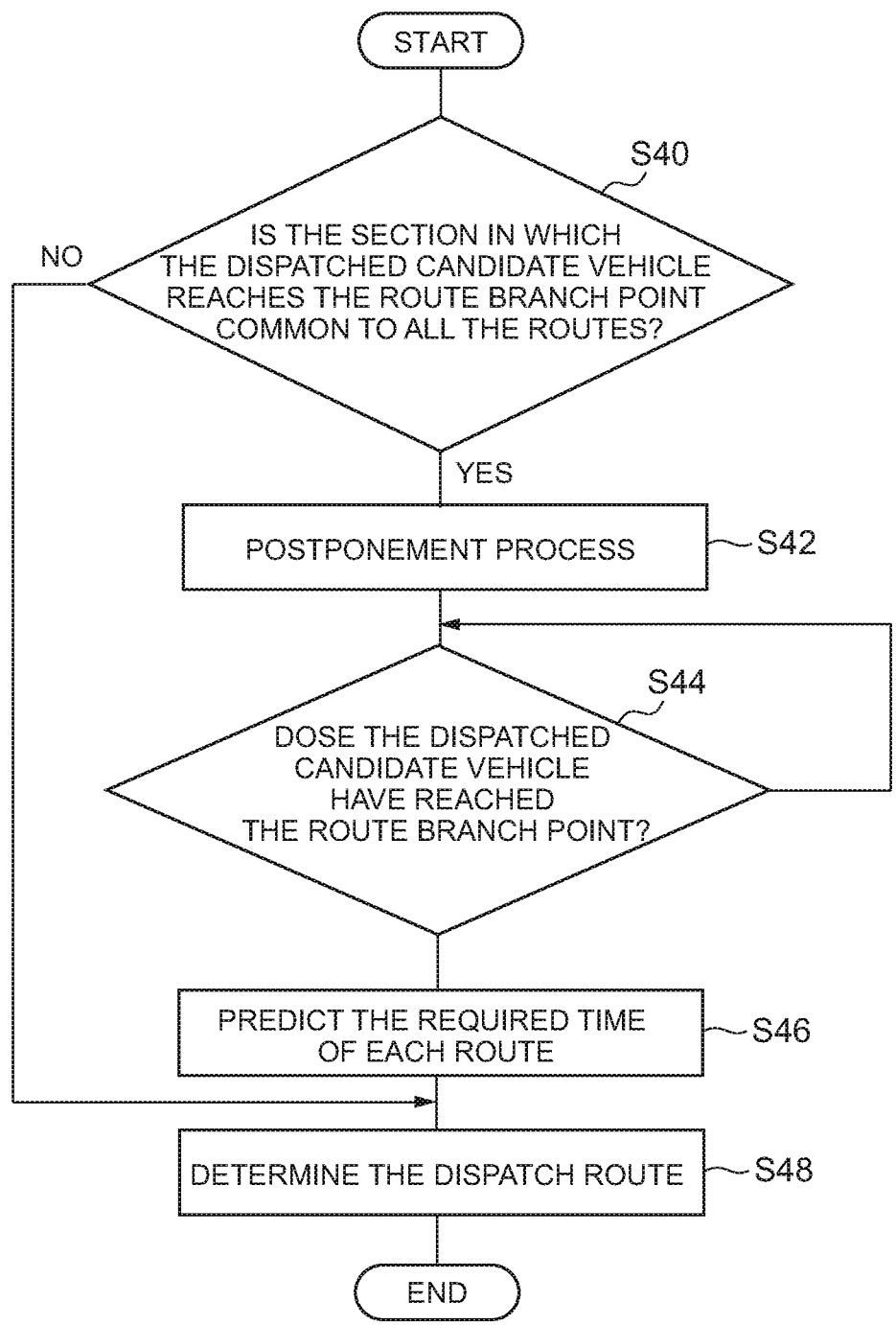
FIG. 11 is a flowchart illustrating an example of a postponement process.

FIG. 11 is a flowchart illustrating an example of a postponement process. The vehicle dispatch server 10 may defer the determination of the dispatch route when there is only one the dispatched candidate vehicle and not one route. For example, in S28 of FIG. 9, the postponement process is performed.

As illustrated in FIG. 11, the vehicle dispatch server 10 determines whether or not the section in which the dispatched candidate vehicle reaches the route branch point is common to all the routes by the vehicle dispatch determination unit 48 in in S40 (postponement determination step). The situation in which all the remaining routes may be common to the road up to the route branch point is the situation shown in FIG. 7. When it is determined that the section up to the point at which the dispatched candidate vehicle reaches the route branch point is common to all the routes (YES in S40), the process proceeds to S42. If it is not determined that the section up to the point at which the dispatched candidate vehicle reaches the route branch point is common to all the routes (NO in S40), the process proceeds to S48.

In S42, the vehicle dispatch server 10 executes a postponement process by the vehicle dispatch determination unit 48 (postponement step). The vehicle dispatch determination unit 48 defers the decision on the dispatch route.

In S44, the vehicle dispatch server 10 determines whether or not the dispatched candidate vehicle has reached the route branch point by the vehicle dispatch determination unit 48 (route branch point determination step). The vehicle dispatch determination unit 48 determines whether or not the dispatched candidate vehicle has reached the route branch point based on the map information and the position information of the dispatched candidate vehicle. When it is not determined that the dispatched candidate vehicle has reached the route branch point (NO in S45), the vehicle dispatch server 10 repeats the determination in S44. If the dispatched candidate vehicle cannot reach the route branch point, the postponement processing is terminated. When it is determined that the dispatched candidate vehicle has reached the route branch point (YES in S45), the vehicle dispatch server 10 shifts to S46.

In S46, the vehicle dispatch server 10 predicts the required time of each route by the required time prediction unit 46 (the required time prediction step after the postponement). The required time prediction unit 46 predicts the required time for each route using the latest traffic information obtained after the start of the postponement process. The required time prediction unit 46 may use the traffic information transmitted from the dispatched candidate vehicle that has reached the route branch point to predict the required time for each route.

In S48, the vehicle dispatch server 10 determines the dispatch route by the vehicle dispatch determination unit 48 (dispatch route determination step). The processing contents in this case are the same as those in S28 of FIG. 9. The vehicle dispatch server 10 then ends the postponement process.

According to the vehicle dispatch system 1 (the vehicle dispatch server 10) according to the present embodiment described above, it is calculated the remote assistance request number which is the number of the remote assistance requests by the autonomous driving vehicle to the remote operator for each route to the point of dispatch P, and the vehicle dispatch route to the point of dispatch where the autonomous driving vehicle travels is determined on the basis of the required time for each route and the remote assistance request number for each route. Therefore, the load of the remote operator can be reduced compared with when the remote assistance request number is not considered.

Further, according to the vehicle dispatch system 1, when there are a plurality of the dispatched candidate vehicles for the point of dispatch P, since the dispatch vehicle to be dispatched to the point of dispatch P is determined based on the required time and the remote assistance request number in the route to the point of dispatch P searched for each the dispatched candidate vehicle, the load on the remote operator R can be reduced as compared with the case where the remote assistance request number is not considered.

Further, according to the vehicle dispatch system 1, since the dispatched candidate vehicle delays the decision of the dispatch route until reaching the route branch point when the section to the route branch point of the dispatched candidate vehicle is common to all the routes, it is possible to predict the required time on the basis of the latest information (traffic information, etc.) after the dispatched candidate vehicle reaches the route branch point, thereby making it possible to determine a more appropriate dispatch route.

Further, according to the vehicle dispatch system 1, since the required time until the autonomous driving vehicle 2 arrives at the dispatch point is predicted based on the trajectory of the autonomous driving including the route and the vehicle speed plan, it is possible to improve the prediction accuracy of the required time as compared with the case where the required time is roughly predicted based on the distance to the point of dispatch P or the like while the vehicle speed is kept constant.

The embodiment of the present disclosure is described above, but the present disclosure is not limited to the above-described embodiment. The present disclosure can be implemented in various forms including various modifications and improvements based on the knowledge of those skilled in the art including the above-described embodiment.

Some of the functions of the vehicle dispatch server 10 in the vehicle dispatch system 1 may be provided on the dispatched candidate vehicle side. For example, the dispatched candidate vehicle selection unit 43 may be implemented at the autonomous driving ECU 20 in the autonomous driving vehicle 2. When the autonomous driving ECU 20 receives the point of dispatch P, it may determine whether it corresponds to the dispatched candidate vehicle using its own position information.

At least one of the traffic information acquisition units 44, the route search unit 45, the required time prediction unit 46, and the remote assistance request number calculation unit 47 may be realized at the autonomous driving ECU 20 of the autonomous driving vehicle 2. As described above, by executing at least one of the acquisitions of traffic information, the route searches up to the point of dispatch P, the prediction of the required time, and the calculation of the remote assistance request number at each the autonomous driving vehicle 2, the calculation amount at the vehicle dispatch server 10 can be reduced.

The vehicle dispatch system 1 may not necessarily need to select the dispatched candidate vehicle. the vehicle dispatch system 1 may determine the autonomous driving vehicle 2 closest to the point of dispatch P as the dispatch vehicle. the vehicle dispatch system 1 may determine as the dispatch vehicle the autonomous driving vehicle 2 which is the shortest distance on the road to the point of dispatch P among the autonomous driving vehicle 2 which has seen the user's designation and has sufficient residual fuel.

The vehicle dispatch server 10 does not necessarily have the traffic information acquisition unit 44. the required time prediction unit 46 may predict the required time without referring to traffic information.

The vehicle dispatch server 10 does not necessarily have to be connected to the remote assistance history database 5. The remote assistance request number calculation unit 47 may compute the remote assistance request number without referring to the request frequency of the remote assistance. The remote assistance request number is not necessarily a number and may be used as a stepwise index.

In the flow chart shown in FIG. 9, when it is determined that the required time of the route is equal to or greater the first time-threshold as a result of predicting the required time by S24, the calculation of the remote assistance request number of the route may be omitted. Similarly, when the remote assistance request number is calculated earlier and it is determined that the remote assistance request number is equal to or greater the first request threshold value, the time required for the route need not be predicted.

What is claimed is:

1. A vehicle dispatch system for dispatching an autonomous driving vehicle capable of traveling with remote assistance by a remote operator, the vehicle dispatch system comprising:
   at least one processor configured to:
   search a route to a point of dispatch based on a predetermined point of dispatch, a position of the autonomous driving vehicle, and map information;
   determine whether there is a plurality of routes to the point of dispatch based on the predetermined point of dispatch, the position of the autonomous driving vehicle and the map information;
   based upon the determination of the plurality of routes, determine whether a route section is common to more than one of the plurality of routes, wherein the route section extends from a current position of the autonomous driving vehicle to a route branch point, wherein the route branch point is a point at which the more than one of the plurality of routes branch apart from each other;
   when the autonomous driving vehicle reaches the route branch point, predict a required time until the autonomous driving vehicle arrives at the point of dispatch by each of the plurality of routes based on the map information;
   calculate a remote assistance request number on each of the plurality of routes, which is the number of remote assistance requests of the autonomous driving vehicle to the remote operator for remote assistance, based on the route and a predetermined remote assistance request condition; where the vehicle dispatch instruction includes a vehicle dispatch route to the autonomous driving vehicle, and would
   determine a vehicle dispatch route to the point of dispatch where the autonomous driving vehicle travels, based on the required time predicted for each of the plurality of routes and the remote assistance request number calculated for each of the plurality of routes.

2. The vehicle dispatch system according to claim 1, wherein the processor is further configured to:
   select dispatched candidate vehicles for the point of dispatch from a plurality of the autonomous driving vehicles based on the point of dispatch and the positions of the autonomous driving vehicles,
   wherein a dispatch vehicle to be dispatched to the point of dispatch and a dispatch vehicle route of the dispatch vehicle is determined based on the required time and the remote assistance request number in the routes to the point of dispatch searched for each of the dispatched candidate vehicles when there is a plurality of the dispatched candidate vehicles selected by the dispatched candidate vehicle selection unit.

3. The vehicle dispatch system according to claim 1, wherein the processor is further configured to:
   acquire a trajectory of autonomous driving including a path on the route and a vehicle speed plan, and predict a required time until the autonomous driving vehicle arrives at the point of dispatch based on the trajectory,
   wherein the path and the vehicle speed plan are generated in accordance with the point of dispatch, the route, the map information, the external environment of the autonomous driving vehicle, and the traveling state of the autonomous driving vehicle.

4. The vehicle dispatch system according to claim 2, wherein the processor is further configured to:
   acquire a trajectory of autonomous driving including a path on the route and a vehicle speed plan, and predict a required time until the autonomous driving vehicle arrives at the point of dispatch based on the trajectory,
   wherein the path and the vehicle speed plan are generated in accordance with the point of dispatch, the route, the map information, the external environment of the autonomous driving vehicle, and the traveling state of the autonomous driving vehicle.

5. A vehicle dispatching server for dispatching an autonomous driving vehicle capable of traveling with remote assistance by a remote operator, the vehicle dispatching server comprising:
   at least one processor configured to:
   search a route to a point of dispatch based on a predetermined point of dispatch, a position of the autonomous driving vehicle, and map information;
   determine whether there is a plurality of routes to the point of dispatch based on the predetermined point of dispatch, the position of the autonomous driving vehicle and the map information;
   based upon the determination of the plurality of routes, determine whether a route section is common to more than one of the plurality of routes, wherein the route section extends from a current position of the autonomous driving vehicle to a route branch point, wherein the route branch point is a point at which the more than one of the plurality of routes branch apart from each other;

when the autonomous driving vehicle reaches the route branch point, predict a required time until the autonomous driving vehicle arrives at the point of dispatch by each of the plurality of routes based on the map information;

calculate a remote assistance request number on each of the plurality of routes, which is the number of remote assistance requests of the autonomous driving vehicle to the remote operator for remote assistance, based on the route and a predetermined remote assistance request condition; where the vehicle dispatch instruction includes a vehicle dispatch route to the autonomous driving vehicle, and would determine a vehicle dispatch route to the point of dispatch where the autonomous driving vehicle travels, based on the required time predicted for each of the plurality of routes and the remote assistance request number calculated for each of the plurality of routes.

6. A vehicle dispatch method of a vehicle dispatch system for dispatching an autonomous driving vehicle capable of traveling with remote assistance by a remote operator, the method comprising:

searching a route to a point of dispatch based on a predetermined point of dispatch, the position of the autonomous driving vehicle, and map information;

determining whether there is a plurality of routes to the point of dispatch based on the predetermined point of dispatch, the position of the autonomous driving vehicle and the map information;

based upon the determination of the plurality of routes, determining whether a route section is common to more than one of the plurality of routes, wherein the route section extends from a current position of the autonomous driving vehicle to a route branch point, wherein the route branch point is a point at which the more than one of the plurality of routes branch apart from each other;

when the autonomous driving vehicle reaches the route branch point, predicting a required time until the autonomous driving vehicle arrives at the point of dispatch by each of the plurality of routes based on the map information;

calculating a remote assistance request number on each of the plurality of routes, which is the number of remote assistance requests of the autonomous driving vehicle to the remote operator for remote assistance, based on the route and a predetermined remote assistance request condition; where the vehicle dispatch instruction includes a vehicle dispatch route to the autonomous driving vehicle, and would determining a vehicle dispatch route to the point of dispatch where the autonomous driving vehicle travels, based on the required time predicted for each of the plurality of routes and the remote assistance request number calculated for each of the plurality of routes.

* * * * *